United States Patent
Kawai

(10) Patent No.: US 9,549,166 B2
(45) Date of Patent: Jan. 17, 2017

(54) IMAGING DEVICE AND SHADING CORRECTION METHOD

(71) Applicant: FUJIFILM Corporation, Tokyo (JP)

(72) Inventor: Tomoyuki Kawai, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/184,101

(22) Filed: Feb. 19, 2014

(65) Prior Publication Data

US 2014/0204178 A1  Jul. 24, 2014

Related U.S. Application Data

(63) Continuation of application No. PCT/JP2012/068173, filed on Jul. 18, 2012.

(30) Foreign Application Priority Data

Aug. 19, 2011  (JP) .................................. 2011-179829

(51) Int. Cl.
*H04N 15/00* (2006.01)
*H04N 13/02* (2006.01)
(Continued)

(52) U.S. Cl.
CPC .......... *H04N 13/0025* (2013.01); *G03B 35/08* (2013.01); *H04N 5/235* (2013.01);
(Continued)

(58) Field of Classification Search
CPC .................. H04N 13/0239; H04N 13/0055
(Continued)

(56) References Cited

U.S. PATENT DOCUMENTS 6,233,003 B1  5/2001 Ono
6,633,415 B1 * 10/2003 Arafune ............... H04N 1/1013
                                                     358/1.9
(Continued)

FOREIGN PATENT DOCUMENTS

JP        10-42314 A    2/1998
JP     2002-131623 A    5/2002
(Continued)

OTHER PUBLICATIONS

International Search Report issued in PCT/JP2012/068173 mailed Oct. 2, 2012.
(Continued)

*Primary Examiner* — Chikaodili E Anyikire
(74) *Attorney, Agent, or Firm* — Birch, Stewart, Kolasch & Birch, LLP

(57) ABSTRACT

An image pick apparatus includes: an imaging element that includes a first pixel group and a second pixel group that respectively photo-electrically converts luminous fluxes that pass through different areas of a single imaging optical system, generates a first image formed by an output value of the first pixel group and a second image formed by an output value of the second pixel group, and is built therein with a pixel addition unit that adds a pixel value of the first pixel group and a pixel value of the second pixel group to generate a two-dimensional image; and an image processing section that matches a shading shape of the first image and a shading shape of the second image with a shading shape of the two-dimensional image by calculating correction coefficients stored in a memory for the output values of the first pixel group and the second pixel group.

17 Claims, 26 Drawing Sheets

(51) Int. Cl.
*H04N 13/00* (2006.01)
*G03B 35/08* (2006.01)
*H04N 5/357* (2011.01)
*H04N 5/235* (2006.01)
*H04N 5/369* (2011.01)

(52) U.S. Cl.
CPC ......... *H04N 5/3572* (2013.01); *H04N 5/3696* (2013.01); *H04N 13/021* (2013.01); *H04N 13/0217* (2013.01); *H04N 13/0232* (2013.01); *H04N 13/0257* (2013.01); *H04N 13/0285* (2013.01)

(58) Field of Classification Search
USPC .......................................................... 348/46
See application file for complete search history.

(56) References Cited

U.S. PATENT DOCUMENTS

| | | | | |
|---|---|---|---|---|
| 2002/0196472 | A1* | 12/2002 | Enomoto | G06T 5/006 358/3.26 |
| 2008/0218597 | A1* | 9/2008 | Cho | H04N 5/2351 348/222.1 |
| 2011/0019028 | A1 | 1/2011 | Kimijima et al. | |
| 2011/0298883 | A1* | 12/2011 | Ohyama | B41J 2/455 347/224 |

FOREIGN PATENT DOCUMENTS

| | | |
|---|---|---|
| JP | 2007-279512 A | 10/2007 |
| JP | 2008-299184 A | 12/2008 |
| JP | 2009-244858 A | 10/2009 |
| JP | 2011-17800 A | 1/2011 |
| WO | WO 2011/004686 A1 | 1/2011 |

OTHER PUBLICATIONS

Written Opinion of the International Searching Authority issued in PCT/JP2012/068173 mailed Oct. 2, 2012.
Extended European Search Report, dated Jun. 10, 2015, in related application No. EP12825618.7.

* cited by examiner

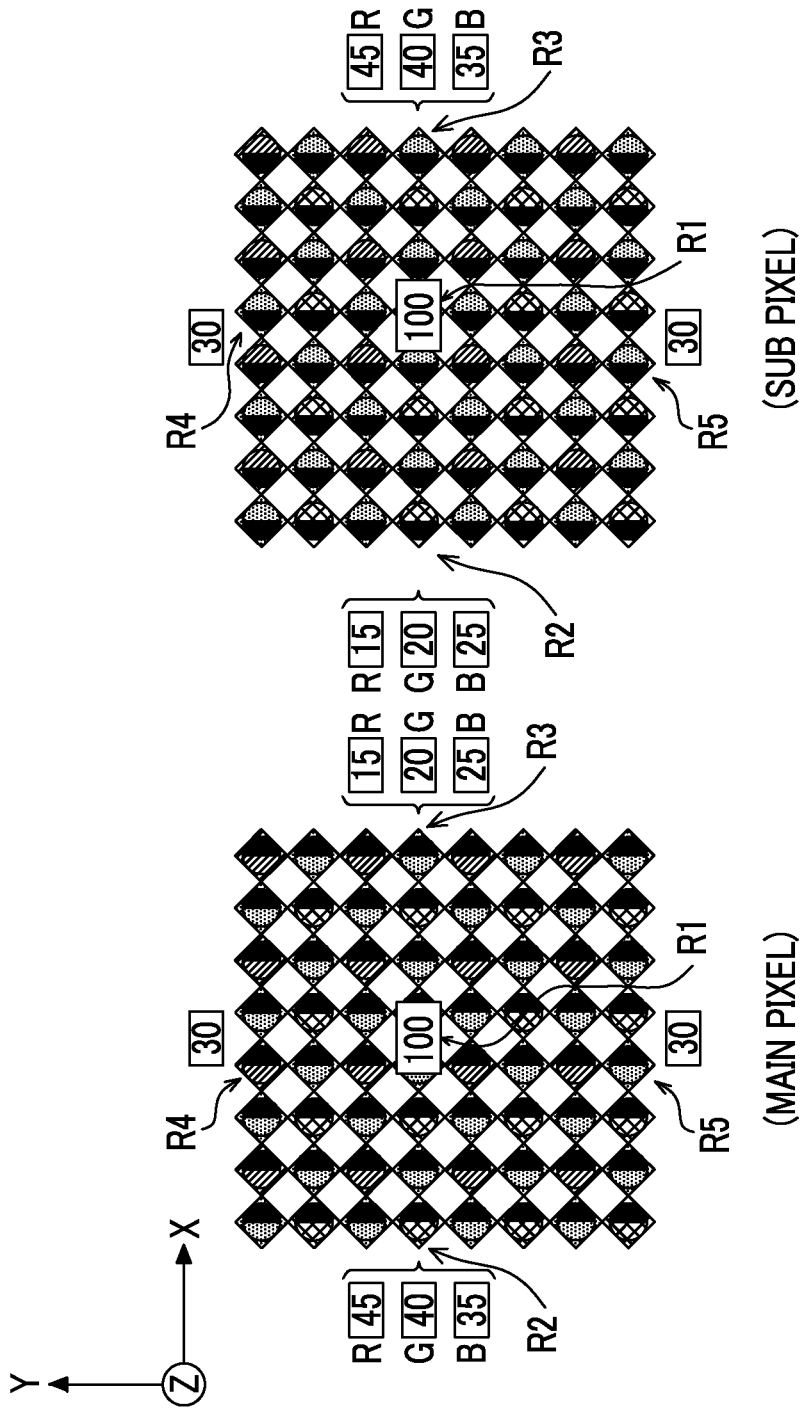

FIG. 9
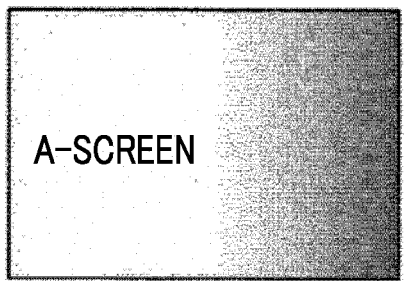
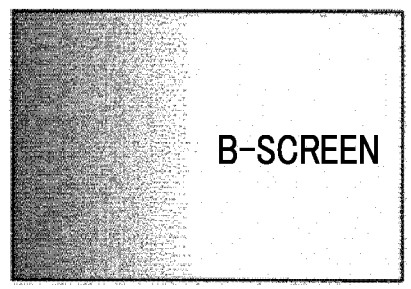

FIG. 10

A-SCREEN SHADING CORRECTION TABLE

| 262 | 263 | 265 | 268 | 272 | 277 | 283 | 291 |
|---|---|---|---|---|---|---|---|
| 260 | 262 | 264 | 268 | 272 | 276 | 282 | 289 |
| 259 | 260 | 264 | 268 | 272 | 276 | 280 | 287 |
| 256 | 260 | 264 | 268 | 272 | 276 | 280 | 285 |
| 257 | 260 | 264 | 268 | 272 | 276 | 280 | 285 |
| 259 | 260 | 264 | 268 | 272 | 276 | 280 | 287 |
| 261 | 262 | 264 | 268 | 272 | 276 | 282 | 288 |
| 263 | 263 | 265 | 268 | 272 | 277 | 283 | 290 |

B-SCREEN SHADING CORRECTION TABLE

| 304 | 295 | 287 | 280 | 274 | 269 | 265 | 263 |
|---|---|---|---|---|---|---|---|
| 302 | 294 | 286 | 280 | 274 | 268 | 264 | 261 |
| 301 | 292 | 286 | 280 | 274 | 268 | 262 | 259 |
| 299 | 292 | 286 | 280 | 274 | 268 | 262 | 257 |
| 299 | 292 | 286 | 280 | 274 | 268 | 262 | 256 |
| 301 | 292 | 286 | 280 | 274 | 268 | 262 | 259 |
| 303 | 294 | 286 | 280 | 274 | 268 | 264 | 260 |
| 305 | 295 | 287 | 280 | 274 | 269 | 265 | 262 |

FIG. 11

| 272 | 268 | 266 | 264 | 264 | 266 | 268 | 272 |
|---|---|---|---|---|---|---|---|
| 270 | 266 | 262 | 262 | 262 | 262 | 266 | 270 |
| 268 | 265 | 259 | 258 | 258 | 259 | 265 | 268 |
| 266 | 264 | 258 | 256 | 256 | 258 | 264 | 266 |
| 266 | 264 | 258 | 256 | 256 | 258 | 264 | 266 |
| 268 | 265 | 259 | 258 | 258 | 259 | 265 | 268 |
| 270 | 266 | 262 | 262 | 262 | 262 | 266 | 270 |
| 272 | 268 | 266 | 264 | 264 | 266 | 268 | 272 |

FIG. 14A

A-SCREEN SHADING CORRECTION TABLE

|   | 0 | | | | | | | | Y |
|---|---|---|---|---|---|---|---|---|---|
| 0 | gain_A(0,0) | | | | | | | | |
|   | | | | | | | | | |
| y | | | | gain_A(x,y) | | | | | |
|   | | | | | | | | | |
|   | | | | | | | | | |
|   | | | | | | | | | |
|   | | | | | | | | | |
| Y | | | | | | | | | |

X across top, Y down side.

FIG. 14B

OUTPUT OF C-SCREEN (SHADING SHAPE)

|   | 0 | | | | X | | | | Y |
|---|---|---|---|---|---|---|---|---|---|
| 0 | 7829.3 | 8030.5 | 8245.4 | 8245.4 | 8150.8 | 8150.8 | 8245.4 | 8032.5 | 7800.3 |
|   | 7942.6 | 8121.4 | 8310.3 | 8306.3 | 8307.3 | 8307.3 | 8306.3 | 8245.4 | 7914.7 |
|   | 8031.5 | 8212.3 | 8435.1 | 8437.1 | 8404.5 | 8404.5 | 8437.1 | 8213.3 | 8030.5 |
| y | 8151.8 | 8243.4 | 8503.0 | 8502.0 | 8435.1 | 8435.1 | 8502.0 | 8245.4 | 8150.8 |
|   | 8150.8 | 8243.4 | 8502.0 | 8501.0 | 8435.1 | 8435.1 | 8501.0 | 8245.4 | 8182.5 |
|   | 8030.5 | 8212.3 | 8436.1 | 8435.1 | 8404.5 | 8404.5 | 8435.1 | 8212.3 | 8032.5 |
|   | 7915.7 | 8120.4 | 8308.3 | 8309.3 | 8306.3 | 8306.3 | 8310.3 | 8120.4 | 7942.6 |
| Y | 7801.3 | 8031.5 | 8243.4 | 8152.8 | 8150.8 | 8150.8 | 8244.4 | 8032.5 | 7830.3 |

Signal_C(x,y)=8401.5

FIG. 14C

OUTPUT OF A-SCREEN (SHADING SHAPE)

|   | 0 | | | | X | | | | Y |
|---|---|---|---|---|---|---|---|---|---|
| 0 | 8208.6 | 8177.4 | 8117.7 | 8026.0 | 7907.0 | 7764.3 | 7601.6 | 7391.7 |
|   | 8271.8 | 8208.6 | 8148.9 | 8026.2 | 7907.7 | 7794.5 | 7626.5 | 7443.8 |
|   | 8305.7 | 8271.8 | 8149.5 | 8027.0 | 7911.2 | 7792.3 | 7681.0 | 7493.7 |
| y | 8402.0 | 8272.8 | 8148.6 | 8025.7 | 7908.0 | 7792.3 | 7683.0 | 7548.3 |
|   | 8369.3 | 8272.4 | 8146.5 | 8026.9 | 7908.9 | 7792.9 | 7683.2 | 7546.3 |
|   | 8303.7 | 8272.8 | 8148.3 | 8029.2 | 7907.4 | 7793.4 | 7683.0 | 7494.7 |
|   | 8241.1 | 8208.6 | 8148.5 | 8025.5 | 7909.3 | 7794.3 | 7627.5 | 7467.7 |
| Y | 8178.4 | 8177.4 | 8115.7 | 8027.0 | 7908.2 | 7764.9 | 7601.6 | 7416.2 |

Signal_A(x,y)=8145.5
gain_A(x,y)=Signal_C(x,y)/Signal_A(x,y)

FIG. 24

SHADING CORRECTION GAIN TABLE

| FOR R OF A-SCREEN | FOR R OF C-SCREEN |
|---|---|
| FOR G OF A-SCREEN | FOR G OF C-SCREEN |
| FOR B OF A-SCREEN | FOR B OF C-SCREEN |
| FOR R OF B-SCREEN | |
| FOR G OF B-SCREEN | |
| FOR B OF B-SCREEN | |

IMAGING DEVICE AND SHADING CORRECTION METHOD

BACKGROUND OF THE INVENTION

1. Field of the Invention

The present invention relates to an imaging device and a shading correction method capable of reliably correcting shading due to pupil division, and capable of easily obtaining a three-dimensional image with a small shading difference compared with a two-dimensional image.

2. Description of the Related Art

JP-A-10-42314 discloses an imaging device that obtains a three-dimensional image using a pupil division method. In an imaging element of the imaging device, an object is imaged by the imaging element while changing the size of a pupil of an imaging lens by an optical shutter to obtain plural viewpoint images.

JP-A-2008-299184 discloses a focus detection apparatus that performs focus detection using a pupil division phase difference detection method. The focus detection apparatus includes an imaging element in which pixels are arranged in two-dimensions and an optical axis of a microlens and the center of a pixel (photoelectric conversion element) are shifted. Here, a configuration in which addition is performed between pixels in which a pupil is shifted to smoothen a blurred image in a non-focused state is disclosed.

JP-A-2009-244858 discloses an imaging device capable of performing focus detection using a pupil division phase difference detection method. Here, a configuration in which three types of shading corrections for a normal pixel, an A image of a focus detection pixel and a B image thereof are performed is disclosed.

JP-A-2011-17800 discloses an imaging device capable of performing focus detection using a pupil division phase difference detection method. Here, a configuration in which pixel values of two pixels in the same pixel group are averaged to enhance the signal-to-noise ratio is disclosed.

However, according to the findings of the present inventors, in the imaging device that obtains the three-dimensional image using the pupil division method as disclosed in JP-A-10-42314, an incident angle of object light is controlled in a laterally opposite direction to allow three-dimensional imaging, and in the case of a lens in which a main ray angle from the lens is changed at an image forming position, shadings with extremely different characteristics occur in a right viewpoint image and a left viewpoint image.

Further, according to the finding of the present inventors, both of imaging of a three-dimensional image (three-dimensional imaging) and imaging of a two-dimensional image (two-dimensional imaging) can be performed with high image quality by reducing the shading difference between the three-dimensional image and the two-dimensional image.

SUMMARY OF THE INVENTION

In order to solve the above problems, an object of the invention is to provide an imaging device and a shading correction method capable of reliably correcting shading due to pupil division and capable of easily obtaining a three-dimensional image with a small shading difference compared with a two-dimensional image.

According to an aspect of the invention, there is provided an imaging device including: a single imaging optical system; an imaging element that includes a first pixel group and a second pixel group that respectively photo-electrically converts luminous fluxes that pass through different areas of the imaging optical system, and generates a first image that is formed by an output value of the first pixel group and a second image that is formed by an output value of the second pixel group; and shading correction means for making a shading shape of the first image obtained by correcting the output value of the first pixel group and a shading shape of the second image obtained by correcting the output value of the second pixel group close to a shading shape of an addition image obtained by adding the output value of the first pixel group and the output value of the second pixel group.

According to this aspect of the invention, it is possible to generate a three-dimensional image formed by the first image and the second image and the addition image (two-dimensional image) generated by adding a pixel value of the first pixel group and a pixel value of the second pixel group. Further, by matching the respective shading shapes of the first image and the second image that form the three-dimensional image with the shading shape of the addition image, it is possible to reliably correct shading due to pupil division, and to easily obtain a three-dimensional image with a small shading difference compared with a two-dimensional image.

Further, according to the above aspect of the invention, it is preferable that the imaging device further include correction coefficient storage means for storing the correction coefficients, and the shading correction means calculates the correction coefficients stored in the correction storage means for the output values of the first and second pixel groups.

Further, according to the above aspect of the invention, the imaging device may further include: pixel addition means that is provided in the imaging element, analogue-adds a pixel value of the first pixel group and a pixel value of the second pixel group, and outputs the addition image; drive means for driving the imaging element, and performing a first drive for generating the first and second images without the analogue addition of the pixel values and a second drive for generating the addition image by the analogue addition, for the imaging element; control means for controlling three-dimensional imaging for obtaining the first and second images by driving the imaging element by the drive means using the first drive to image an object and two-dimensional imaging for obtaining the addition image by driving the imaging element by the drive means using the second drive to image the object, and performing the two-dimensional imaging in parallel with the three-dimensional imaging when the object is imaged by the three-dimensional imaging; and correction coefficient calculation means for calculating the correction coefficients based on the first and second images and the addition image and storing the calculated correction coefficients in the correction coefficient storage means. Here, the analogue addition refers to an addition before A/D conversion, which is preferably an addition of any set of charges, voltage signals and current signals.

Further, according to the above aspect of the invention, the imaging device may further include: pixel addition means for digitally adding the pixel value of the first pixel group and the pixel value of the second pixel group output from the imaging element and outputting the addition image; drive means for driving the imaging element; control means for performing the three-dimensional imaging for obtaining the first and second images by driving the imaging element by the drive means to image an object; and correction coefficient calculation means for calculating the correction coefficients based on the first and second images and the addition image and storing the calculated correction coefficients in the correction coefficient storage means. Here, the digital addition refers to an addition after the A/D conversion, which is preferably an addition of digital pixel values.

Further, according to the above aspect of the invention, in the imaging device, it is preferable that the control means performs the two-dimensional imaging at exposure-under compared with the three-dimensional imaging when the three-dimensional imaging and the two-dimensional imaging are performed to calculate the correction coefficients by the correction coefficient calculation means.

Further, according to the above aspect of the invention, in the imaging device, it is preferable that the control means shorten an exposure time of the two-dimensional imaging compared with an exposure time of the three-dimensional imaging.

Further, according to the above aspect of the invention, in the imaging device, it is preferable that the control means image the object using an ND filter in the two-dimensional imaging.

Further, according to the above aspect of the invention, in the imaging device, it is preferable that the control means reduce a gain in the two-dimensional imaging compared with the three-dimensional imaging.

Further, according to the above aspect of the invention, in the imaging device, it is preferable that the correction coefficient calculation means respectively divide the first image, the second image and the addition image into a plurality of areas, calculate the ratios of the output values of the respective pixel groups in the first and the second images and the output value of the pixel addition means in the addition image for each divided area, and set the ratios for each divided area as the correction coefficients.

Further, according to the above aspect of the invention, in the imaging device, it is preferable that the correction coefficient calculation means subtract the output value of the pixel addition means from the output value of the first pixel group to obtain a first subtraction result, and using the correction coefficient for the output value of the first image group in an image area where the first subtraction result is the highest value as a reference, makes the correction coefficient for the output value of the first image group in the other image areas larger than the reference to perform standardization; and subtract the output value of the pixel addition means from the output value of the second pixel group to obtain a second subtraction result, and using the correction coefficient for the output value of the second image group in an image area where the second subtraction result is the highest value as a reference, makes the correction coefficient for the output value of the second image group in the other image areas larger than the reference to perform standardization.

Further, according to the above aspect of the invention, in the imaging device, it is preferable that the correction coefficient calculation means subtract the output value of the pixel addition means from the output value of the first pixel group to obtain a first subtraction result, subtract the output value of the pixel addition means from the output value of the second pixel group to obtain a second subtraction result, and using the correction coefficient corresponding to the first subtraction result or the second subtraction result that is the highest value among the first subtraction result and the second subtraction result in all pixel areas as a reference, perform standardization for making the other correction coefficient larger than the reference.

Further, according to the above aspect of the invention, in the imaging device, it is preferable that the correction coefficient storage means store a first correction coefficient for matching a shading shape of the first image with a shading shape of the addition image, a second correction coefficient for matching a shading shape of the second image with the shading shape of the addition image, and a third correction coefficient for correcting the shading shape of the addition image, and that the shading correction means calculate the third correction coefficient after calculating the first correction coefficient for a pixel value of the first image, and calculate the third correction coefficient after calculating the second correction coefficient for a pixel value of the second image.

Further, according to the above aspect of the invention, in the imaging device, it is preferable that the correction coefficient storage means store a first correction coefficient for matching a shading shape of the first image with a shading shape of the addition image, a second correction coefficient for matching a shading shape of the second image with the shading shape of the addition image, and a third correction coefficient for correcting the shading shape of the addition image, and that the correction coefficient storage means obtain a fourth correction coefficient by multiplying the first correction coefficient by the third correction coefficient, obtain a fifth correction coefficient by multiplying the second correction coefficient by the third correction coefficient, calculate the fourth correction coefficient for the first image, and calculate the fifth correction coefficient for the second image.

Further, according to the above aspect of the invention, in the imaging device, it is preferable that the first and second pixel groups of the imaging element respectively include a plurality of pixels that is provided with each color filter of R (red), G (green) and B (blue), and that the pixel addition means add pixel values of the pixels with the same color for each color of R, G and B.

Further, according to the above aspect of the invention, in the imaging device, it is preferable that the correction coefficient storage means store the correction coefficient for each color of R, G and B.

Further, according to the above aspect of the invention, in the imaging device, it is preferable that the second pixel group include two or more pixel groups.

According to another aspect of the invention, there is provided a shading correction method for correcting shading of an image generated in an imaging device that includes a single imaging optical system and an imaging element that includes a first pixel group and a second pixel group that respectively photo-electrically converts luminous fluxes that pass through different areas of the imaging optical system, the method including: performing correction, using correction coefficients, for output values of the first and second pixel groups to match a shading shape of a first image that is formed by the output value of the first pixel group and a shading shape of a second image that is formed by the output value of the second pixel group with a shading shape of an addition image obtained by adding the pixel value of the first pixel group and the pixel value of the second pixel group.

According to the invention, it is possible to reliably correct shading due to pupil division, and to easily obtain a three-dimensional image with a small shading difference compared with a two-dimensional image.

BRIEF DESCRIPTION OF THE DRAWINGS

FIG. 5A is a diagram illustrating shading correction in a first pixel group, and FIG. 5B is a diagram illustrating shading correction in a second pixel group.

FIG. 9 is a diagram illustrating examples of an A-screen image and a B-screen image.

FIG. 10 is a diagram illustrating examples of an A-screen shading correction table and a B-screen shading correction table.

FIG. 11 is a diagram illustrating an example of a C-screen shading correction table.

FIGS. 14A to 14C are diagrams illustrating respective examples of an A-screen shading correction table, a shading shape of a C-screen image and a shading shape of an A-screen image.

FIG. 24 is a diagram illustrating a table of respective shading correction gains of R, G and B.

DESCRIPTION OF THE PREFERRED EMBODIMENTS

Hereinafter, embodiments of the invention will be described in detail with reference to the accompanying drawings.

Figure 1:
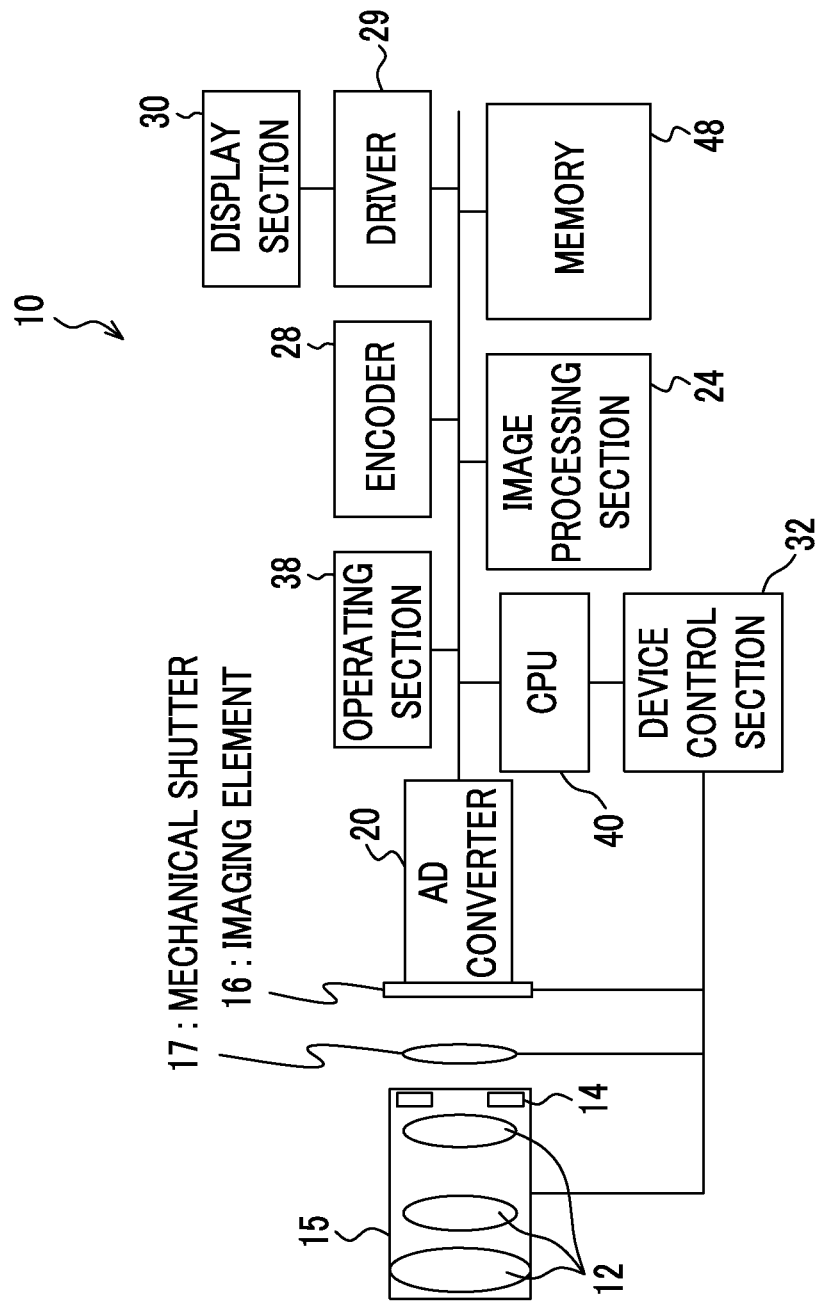
FIG. 1 is a block diagram illustrating an example of an imaging device.

FIG. 1 is a block diagram illustrating an overall configuration of an example of an imaging device according to an embodiment of the invention.

An imaging device 10 includes: a single imaging optical system 15 that includes an imaging lens 12 and a stop 14; an imaging element 16 that images an object through the image imaging optical system 15; a mechanical shutter 17 capable of shading the imaging element 16 by isolating the imaging optical system 11 from the imaging element 16; an A/D converter 20 that converts an image (pixel signal) output from the imaging element 16 from an analogue signal into a digital signal; an image processing section 24 that performs a variety of image processing for the image output from the A/D converter 20; an encoder 28 that encodes the image processed by the image processing section 24 to be output by a display section 30; the display section 30 that displays the image encoded by the encoder 28; a device control section 32 that is drive means for driving the image imaging optical system 15, the imaging element 16 and the mechanical shutter 17; an operating section 38 that receives an instruction input from a user; a CPU 40 that controls respective sections of the imaging device 10; and a memory 48 that is correction coefficient storage means for storing images and various information. In the imaging device 10 with such a configuration, the CPU 40 corresponds to control means and correction coefficient calculation means, to be described later, and is a component of shading correction means, but CPUs corresponding to the respective means or a CPU corresponding to a part of the means may be individually provided.

The imaging element 16 may be an imaging element integrally formed with the A/D converter 20. In this case, in the following description, the A/D converter corresponds to an A/D conversion function in the imaging element 16.

Figure 2:
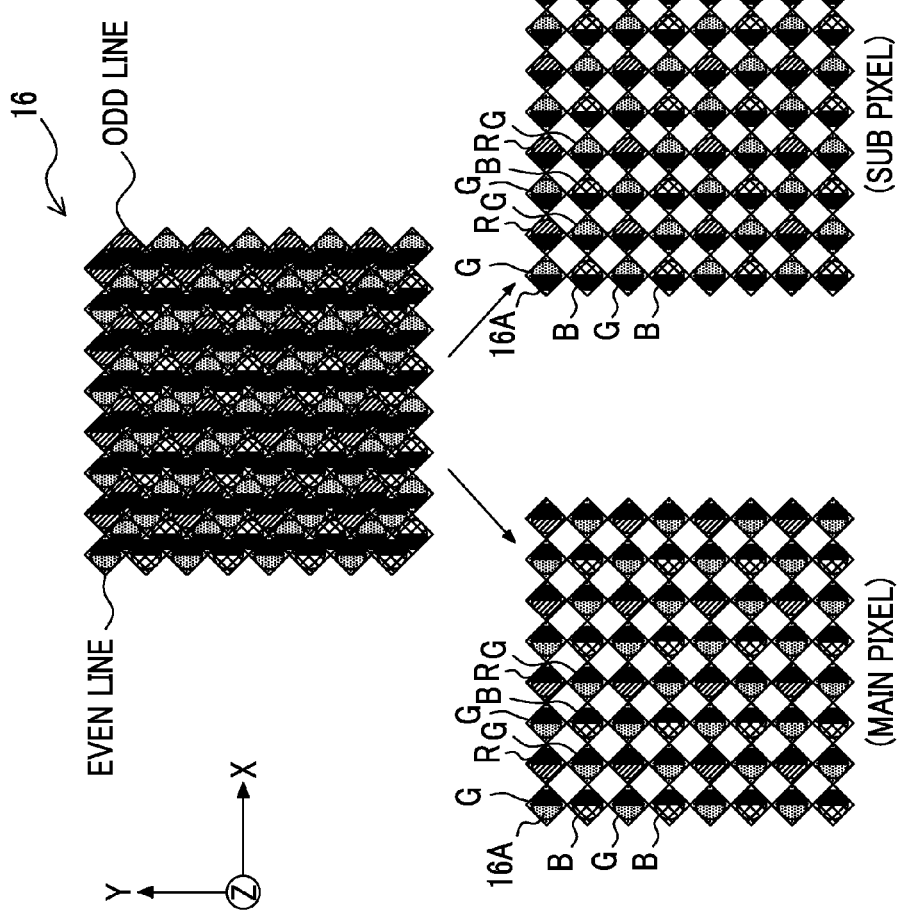
FIGS. 2A-2C are configuration diagrams illustrating a detailed main part of an example of an imaging element.

FIGS. 2A to 2C are configuration diagrams illustrating a part of an example of the imaging element 16. FIG. 2A shows a first pixel group (referred to as a "A-screen pixel group") and a second pixel group (referred to as a "B-screen pixel group") in a honeycomb array, FIG. 2B shows only the first pixel group, and FIG. 2C shows only the second pixel group.

As shown in FIGS. 2A to 2C, the imaging element 16 of the present example includes first pixels (referred to as "A-screen pixels") on odd lines in the vertical direction (y-axis direction in the figures) and second pixels (referred to as "B-screen pixels") on even lines in the vertical direction, respectively arranged in a matrix form, and can individually read respective pixel signals that are respectively photo-electrically converted by the first pixel group and the second pixel group as a first viewpoint image (referred to as a "A-screen image") and a second viewpoint image (referred to as a "B-screen image").

As shown in FIGS. 2A to 2C, on the odd lines (1, 3, 5, . . . ) of the imaging element 16, a horizontal line having a pixel array of G, R, G, R . . . and a horizontal line having a pixel array of B, G, B, G . . . , among pixels having respective color filters of R (red), G (green) and B (blue), are alternately provided. On the other hand, in the pixels on the even lines (2, 4, 6 . . . ), similarly to the odd lines, a horizontal line having a pixel array of G, R, G, R . . . and a horizontal line having a pixel array of B, G, B, G . . . are alternately provided, in which the pixels are shifted in each line direction by a ½ pixel pitch with respect to the pixels on the odd lines.

Figure 3:
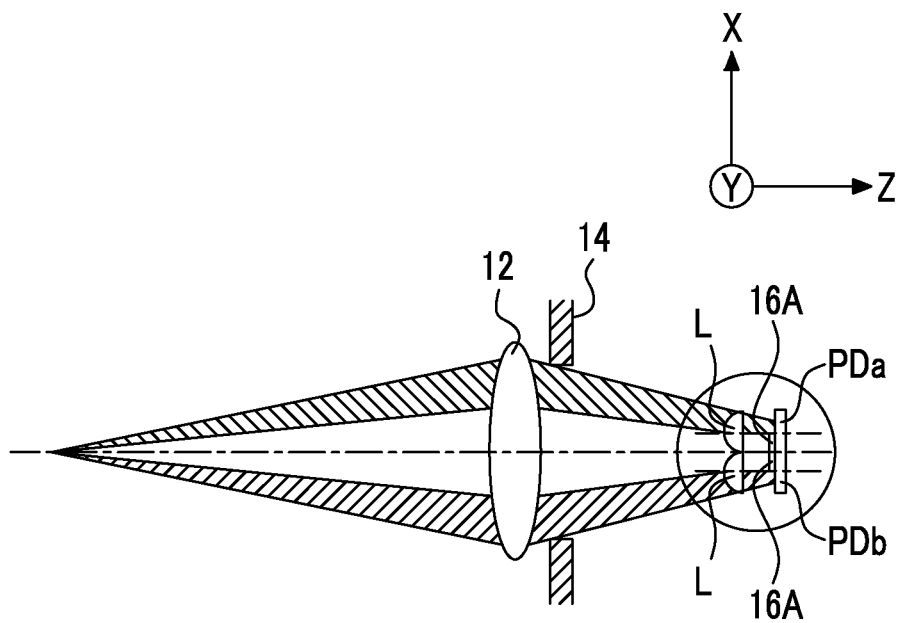
FIG. 3 is a schematic diagram illustrating the principle of three-dimensional imaging.
Figure 4A:
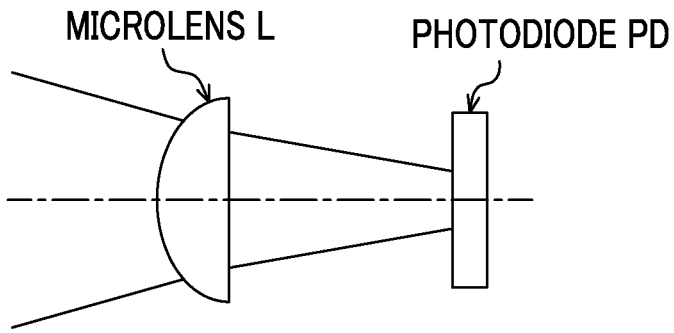
FIG. 4A is an enlarged view illustrating a main part of a pixel in the related art.
Figure 4B:
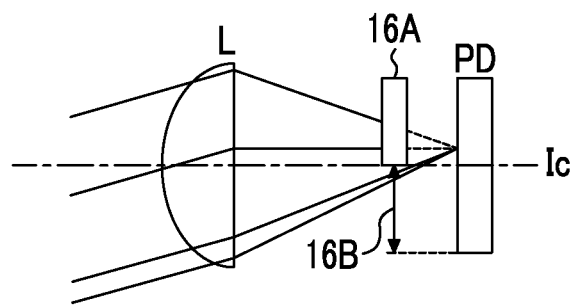
FIGS. 4B-4C are enlarged views illustrating a main part of a pixel in the invention.
Figure 4C:
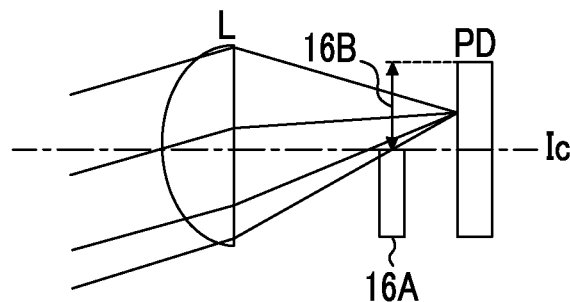

FIG. 3 is a schematic diagram illustrating the imaging lens 12, the stop 14, and one first pixel PDa and one second pixel PDb of the imaging element 16. FIGS. 4A to 4C are enlarged views of a main part in FIG. 3.

FIG. 4A shows a pixel (photodiode) of an imaging element in the related art and its peripheral part. In the related art, a luminous flux that passes through an exit pupil of the imaging lens 12 is incident onto a photodiode PD through a microlens L without restriction (shielding).

FIGS. 4B and 4C show a pixel of an example of the imaging element in the invention and its peripheral part. A shading member 16A is provided in front of each photodiode PD of the imaging element 16, and in the present example, a left half part or a right half part of each photodiode PD is shaded by the shading member 16A. By providing the shading member 16A by changing a deviation amount of an end part of the shading member 16A with respect to an optical axis Ic of the microlens L in the figures, that is, by changing the area (shading capacity) of the shading member 16A, it is possible to change an incident angle of the luminous flux with respect to each photodiode PD and a light reception amount of each photodiode PD. In other words, by changing the area (aperture area) of an aperture 16B of the shading member 16A, it is possible to change the incident angle of the luminous flux with respect to each photodiode PD and the light reception amount of each photodiode PD.

The imaging element 16 with such a configuration is configured so that areas (right half parts and left half parts) in the first pixel and the second pixel where the luminous flux is restricted by the shading member 16A are different from each other.

Alternatively, without providing the shading member 16A, the microlens L and the photodiode PD may be relatively shifted in a lateral direction, so that the luminous flux incident onto the photodiode PD may be restricted by the shift in the direction. By providing one microlens with respect to two pixels (the first pixel and the second pixel), the luminous flux incident onto each pixel may be restricted.

As shown in FIG. 3, shaded areas where the luminous flux is restricted (shaded) by the shading member 16A are different from each other in the first pixel PDa and the second pixel PDb. That is, the shading member 16A has a function of a pupil division member, and allows the luminous flux that passes through one half of the exit pupil to be incident onto the first pixel PDa and the luminous flux that passes through the other half of the exit pupil to be incident onto the second pixel PDb.

However, in FIG. 3, a state where the luminous flux that passes through the right half of the exit pupil is incident onto the first pixel PDa and the luminous flux that passes through the left half of the exit pupil is incident onto the second pixel PDb is schematically shown, but in reality, which half of the exit pupil (the right half or the left half) the luminous flux that passes through to be incident onto the first pixel PDa (or the second pixel PDb) depends on a structure of the microlens L, the shading member 16A and the photodiode PD (pixel).

Further, in the present embodiment, an example in which the pupil division is performed in the horizontal direction (x-axis direction in FIG. 3) is shown, but the invention is not limited thereto. That is, the pupil division may be performed in the vertical direction, or may be performed in both of the horizontal direction and the vertical direction.

Returning to FIG. 1, signal charges (a pixel value) stored in the imaging element 16 are read as a voltage signal according to signal charges based on a reading signal applied from the device control section 32. The voltage signal read from the imaging element 16 is applied to the A/D converter 20. The A/D converter 20 converts pixel signals that are sequentially input into digital pixel signals to be output. In the present example, an R, G or B signal (image signal of each color of R, G and B) for every pixel is analogue-amplified in the imaging element 16, and then, is output to the A/D converter 20. An analogue signal processing section may be provided between the imaging element 16 and the A/D converter 20, and may perform a process such as amplification.

The image processing section 24 performs predetermined signal processing such as shading correction, offset processing, white balance correction and luminance and chrominance (YC) processing with respect to the digital image signal input through the A/D converter 20.

Here, as shown in FIGS. 2B and 2C, signals read from the first pixels on the odd lines of the imaging element 16 are processed as pixel values of one viewpoint image (A-screen image), and signals read from the second pixels on the even lines are processed as pixel values of the other viewpoint image (B-screen image).

The A-screen image and the B-screen image processed in the image processing section 24 are input to the memory 48. The images read from the memory 48 are encoded in the video encoder 28, and are output to the display section 30 for three-dimensional display provided on the rear of a camera through a driver 29. Thus, a three-dimensional or two-dimensional object image is displayed on a display-screen of the display section 30.

The display section 30 in the present example is three-dimensional display means capable of displaying a three-dimensional image (the first viewpoint image and the second viewpoint image) as directional images having a predetermined directionality by a parallax barrier, respectively, but the invention is not limited thereto, and may employ display means using a lenticular lens, or display means provided with special glasses such as polarization glasses or liquid crystal shutter glasses and capable of individually displaying the respective viewpoint images.

Further, if there is a first-stage push (half push) for a shutter button (referred to as a "imaging button") of the operating section 38, the CPU 40 starts an AF control and an AE control, and performs a control for moving a focus lens in the imaging lens 12 to a focusing position through the device control section 32.

If there is a second-stage push (full push) for the shutter button after performing the AE control and the AF control by the CPU 40, image data corresponding to two sheets of the A-screen image (the first viewpoint image) and the B-screen image (the second viewpoint image) corresponding to the first pixels and the second pixels output from the A/D converter 20 is input to the memory 48 for storage in response to the second-stage push.

The image data corresponding to two sheets stored in the memory 48 is appropriately read by the image processing section 24, in which predetermined signal processing including shading correction is performed. The image data passed through the shading correction is stored in the memory 48 again.

As described above, the imaging element 16 has plural pixels for every color of R (red), G (green) and B (blue), and photo-electrically converts the luminous fluxes that pass through the different areas (for example, the right half and the left half) of the exit pupil of the imaging lens 12, to thereby obtain plural viewpoint images.

Next, the shading correction in the shading correction means (the CPU 40 and the image processing section 24) of the present embodiment will be described. Shading correction amounts along the pupil division direction (lateral direction in the present embodiment) are different from each other in the plural viewpoint images (the A-screen image and the B-screen image), and shading correction amounts along the pupil division direction for every color of R, G and B are also different from each other.

FIGS. 5A and 5B are diagrams illustrating light reception amounts of R, G and B pixels in the first pixel group and the second pixel group, respectively. In both of the first pixel group shown in FIG. 5A and the second pixel group shown in FIG. 5B, the light reception amount of each pixel is reduced at peripheral parts (R2, R3, R4 and R5), compared with a central part R1. Further, in the first pixel group shown in FIG. 5A, in the pupil division direction X (lateral direction), the light reception amount on the right end side in the figure is smaller than that on the left end side in the figure. Further, in the second pixel group shown in FIG. 5B, in the pupil division direction X (lateral direction), the light reception amount on the left end side in the figure is smaller than that on the right end side in the figure.

For every color of R, G and B, the shading correction means of the present embodiment strengthens the shading correction at the peripheral part R3 on the right side in the figure compared with the peripheral part R2 on the left side in the figure in the lateral direction (horizontal direction) of the pupil division, with respect to the pixel signal (A-screen image) output from each pixel of the first pixel group, and weakens the shading correction at the peripheral part R3 on the right side in the figure compared with the peripheral part R2 on the left side in the figure in the lateral direction of the pupil division, with respect to the pixel signal (B-screen image) output from each pixel of the second pixel group (The shading correction strengthens in R2 than in R3).

Further, the shading correction means of the present embodiment has a function of strengthening concentric shading correction depends on how far each viewpoint image is from the center, with reference to a central point corresponding to an optical axis of the imaging lens 12, with respect to the respective viewpoint images (the first viewpoint image and the second viewpoint image). Here, in the invention, the shading correction may not be performed in some cases.

The shading correction means of the present embodiment calculates correction coefficients of an A-screen shading correction table and a B-screen shading correction table stored in the memory 48, for an output value of the first pixel group (A-screen image group) and an output value of the second pixel group (B-screen image group), and matches a shading shape of the A-screen image that is formed by the output value of the first pixel group and a shading shape of the B-screen image that is formed by the output value of the second pixel group with a shading shape of a C-screen image (addition image) that is formed by an output value of pixel addition means (A-screen shading correction and B-screen shading correction).

Further, in the present embodiment, the shading correction means of the present example calculates a correction coefficient of a C-screen shading correction table stored in the memory 48, for the output value of the pixel addition means in the imaging element 16, to correct the shading shape of the C-screen image (addition image). Further, the image processing section 24 of the present example executes the above-described individual shading corrections (the A-screen shading correction and the B-screen shading correction), and then calculates the correction coefficient of the C-screen shading correction table stored in the memory 48 for the pixel value of the A-screen image and the pixel value of the B-screen image, to correct the shading shapes of the A-screen image and the B-screen image again (AB-screen shading correction). The C-screen shading correction and the AB-screen shading correction are referred to as a "common shading correction", hereinafter.

The pupil division direction on the image corresponds to a pupil division direction on an actual space (that is, a direction connecting the pupil-divided areas of the imaging lens 12). In the present embodiment, since the pupil is divided to the left half and the right half, the pupil division direction is the lateral direction (X direction). As shown in FIG. 3, when the center of the optical axis of the imaging lens 12 directly faces the imaging element 16 without bending, the pupil division direction in the imaging element 16 is the lateral direction (X direction). Here, in a so-called bending optical system, the pupil division direction in the imaging lens 12 is a projection direction on a light reception surface of the imaging element 16 along a bended optical path.

Figure 6:
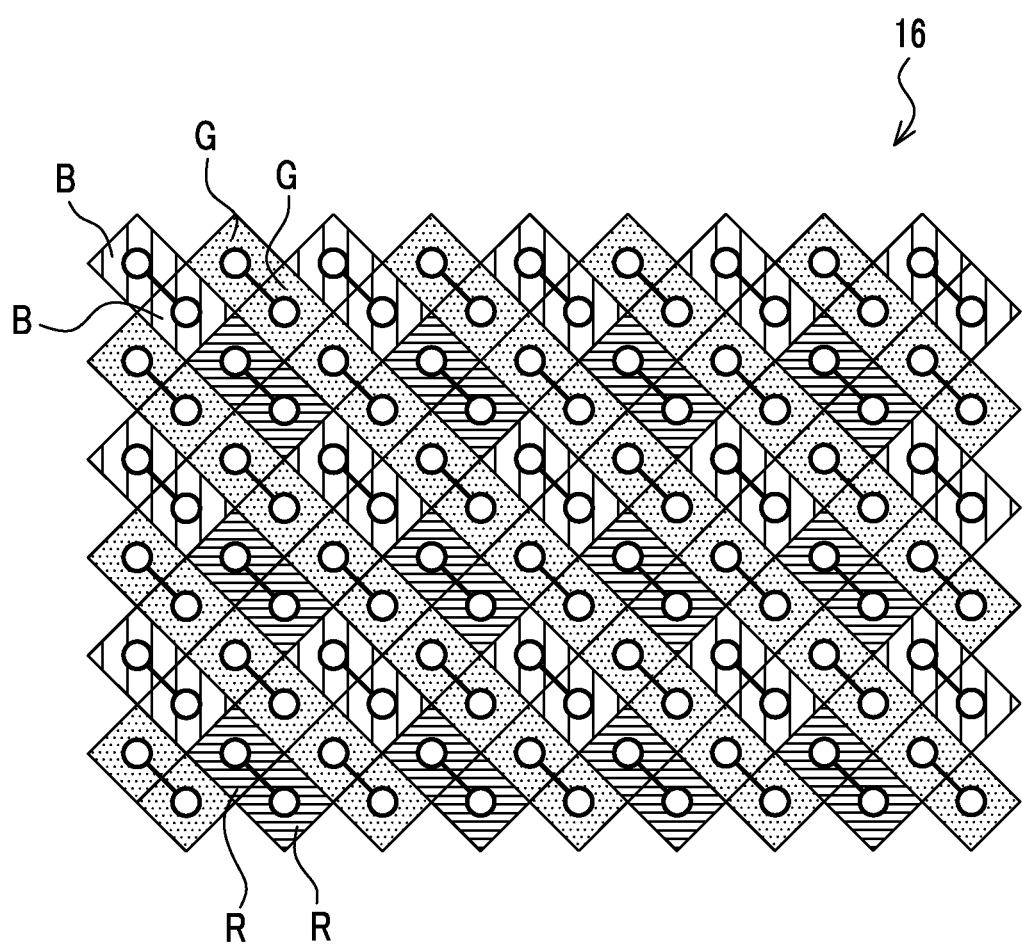
FIG. 6 is a diagram illustrating a pixel addition function of an imaging element.

FIG. 6 is a diagram illustrating a pixel addition function of the imaging element 16. The imaging element 16 in the present example is built therein with the pixel addition means that adds the pixel value of the A-screen pixel group and the pixel value of the B-screen pixel group to generate the C-screen image (addition image). The pixel addition means analogue-adds the pixel value of the A-screen pixel group and the pixel value of the B-screen pixel group. The analogue addition refers to an addition before the A/D conversion, which is any addition of charges, voltage signals and current signals. As shown in FIG. 6, pixel values are added for every adjacent "R" pixels, pixel values are added for every adjacent "G" pixels, and pixel values are added for every adjacent "B" pixels.

Figure 7:
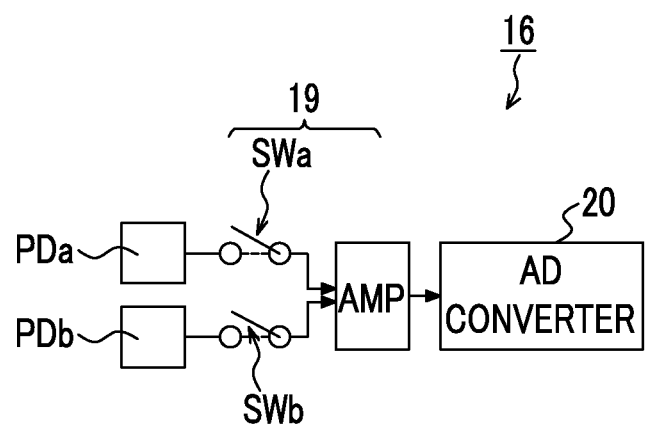
FIG. 7 is a diagram schematically illustrating an example of pixel addition means built in an imaging element.

FIG. 7 is a diagram schematically illustrating an example of the pixel addition means built in the imaging element 16, for description of an example of the analogue pixel addition. In FIG. 7, the imaging element 16 in the present example has an amplifier AMP, a first switch SWa is a switch device that determines whether to input an accumulated charge (analogue pixel value) of the first pixel PDa to the amplifier AMP, and a second switch SWb is a switch device that determines whether to input a stored charge (analogue pixel value) of the second pixel PDb to the amplifier AMP. In two-dimensional imaging, two switches SWa and SWb are turned on so that the stored charge of the first pixel PDa and the stored charge of the second pixel PDb are input to the amplifier AMP, and thus, a pixel-added and amplified pixel signal (analogue pixel addition value) is output to the A/D converter 20. In three-dimensional imaging, the first switch SWa is turned on and the second switch SWb is turned off so that only the stored charge of the first pixel PDa is input to the amplifier AMP, and thus, the amplified pixel signal (first analogue pixel value) is input to the A/D converter 20, or the first switch SWa is turned off and the second switch SWb is turned on so that only the stored charge of the second pixel PDb is input to the amplifier AMP, and thus, the amplified pixel signal (second analogue pixel value) is input to the A/D converter 20. In the present example, the pixel addition means is configured to include the amplifier AMP.

FIG. 7 shows an example in which the pixel addition is performed in the charge state, but the invention is not limited thereto. In the configuration of FIG. 7, in three-dimensional imaging, the first pixel PDa and the second pixel PDb cannot be read at the same time, but a configuration in which the first pixel PDa and the second pixel PDb can be read at the same time may be used. Further, the pixel addition in the invention is not limited to a case where the pixel addition is performed in the stored charge state, and may be also performed in a voltage state. For example, voltages of the pixel values amplified by the amplifier are added. Further, the invention is not limited to a case where the pixel addition is performed in the analogue signal processing, and may be also performed by digital signal processing.

As in pixel addition means 19 (SWa, SWb and AMP) in the present example, when the pixel addition is performed in the analogue pixel values, compared with a case where the pixel addition is performed in digital pixel values, it is possible to achieve a pixel addition value with high accuracy.

Figure 8:
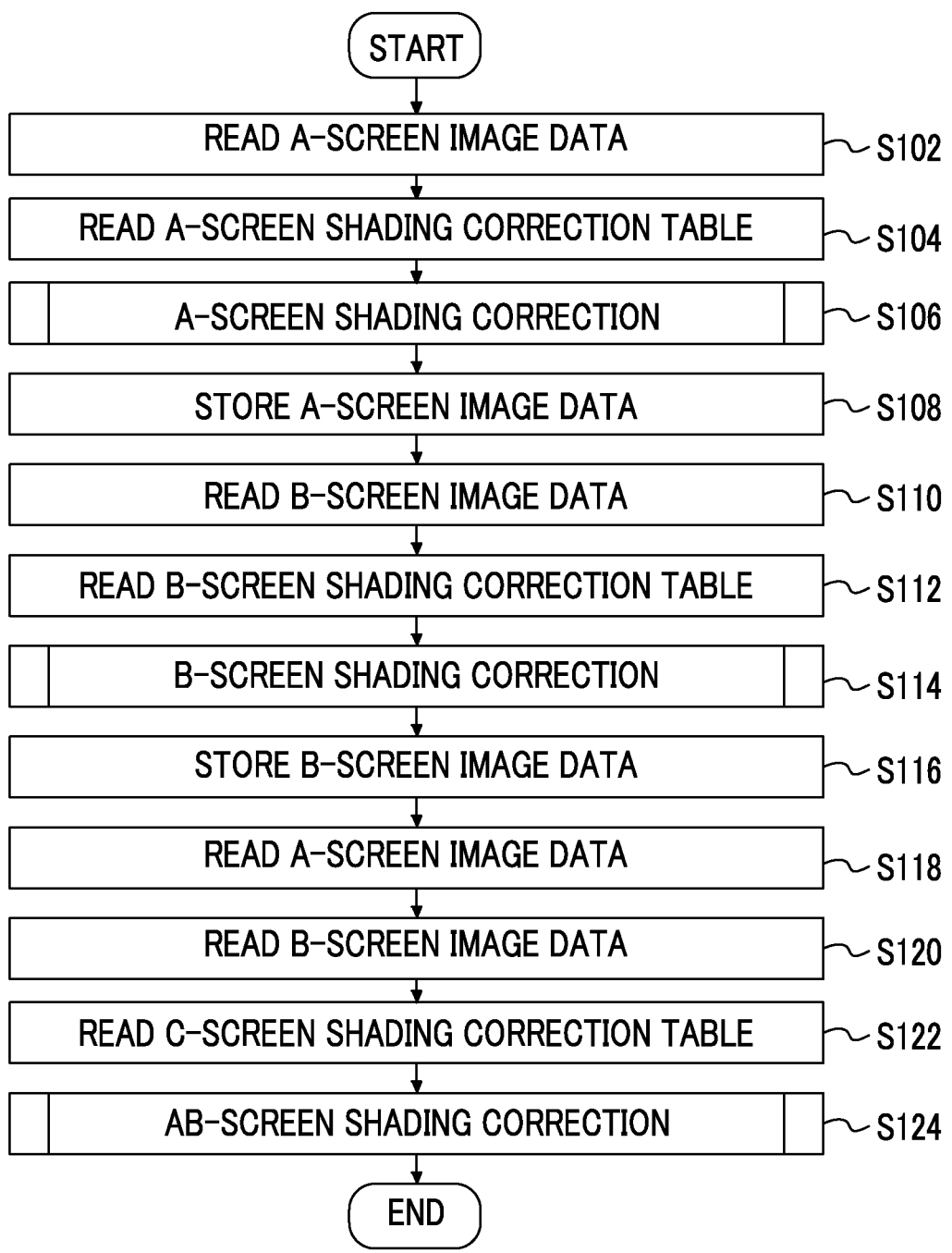
FIG. 8 is a flowchart illustrating the flow of a first example of a shading correction process.

FIG. 8 is a flowchart illustrating the flow of a first example of the shading correction process. This process is executed according to a program by the CPU 40.

This process represents a shading correction process in three-dimensional imaging. This process is executed according to the program by the CPU.

In the present example, it is assumed that the imaging element 16 is controlled by the device control section 32 and an object is three-dimensionally imaged by the imaging element 16.

First, the A-screen image (the first image) is obtained (step S102). An example of the A-screen image is shown on the left side in FIG. 9.

Then, the A-screen shading correction table is obtained from the memory 48 (step S104). An example of the A-screen shading correction table is shown on the upper side in FIG. 10.

Then, the shading shape of the A-screen image is made to match the shading shape of the C-screen image, based on the A-screen shading correction table (step S106).

Then, the shading-corrected A-screen image is stored in the memory 48 (step S108).

Then, the B-screen image (the second image) output from the imaging element 16 is obtained (step S110). An example of the B-screen image is shown on the right side in FIG. 9

Then, the B-screen shading correction table is obtained from the memory (step S112). An example of the B-screen shading correction table is shown on the lower side in FIG. 10.

Then, the shading shape of the B-screen image is made to be close to the shading shape of the C-screen image, based on the B-screen shading correction table (step S114).

Here, the expression "close to" refers to "the same as" or "similar to".

Then, the shading-corrected B-screen image is stored in the memory 48 (step S116).

Then, the A-screen image is obtained (step S118).

Then, the B-screen image is obtained (step S120).

Then, the shading of the A-screen image is corrected and the shading of the B-screen image is corrected, base on the C-screen shading correction table (step S122). An example of the C-screen shading correction table is shown in FIG. 11.

In the present example, each pixel value of the A-screen image is multiplied by a correction gain (a first correction coefficient) of the A-screen shading correction table, and then, is multiplied by a correction gain (a third correction coefficient) of the C-screen shading correction table. Further, each pixel value of the B-screen image is multiplied by a correction gain (a second correction coefficient) of the B-screen shading correction table, and then, is multiplied by the correction gain (the third correction coefficient) of the C-screen shading correction table.

Further, the CPU 40 (correction coefficient calculation means) divides the A-screen image, the B-screen image and the C-screen image to plural areas, respectively, calculates the ratio of output values of the respective pixel groups in the A-screen image and the B-screen image and an output value of the image processing section 24 (pixel addition means) in the C-screen image for each divided area, and stores the ratio for each divided area in the memory 48 as a correction coefficient.

Figure 12:
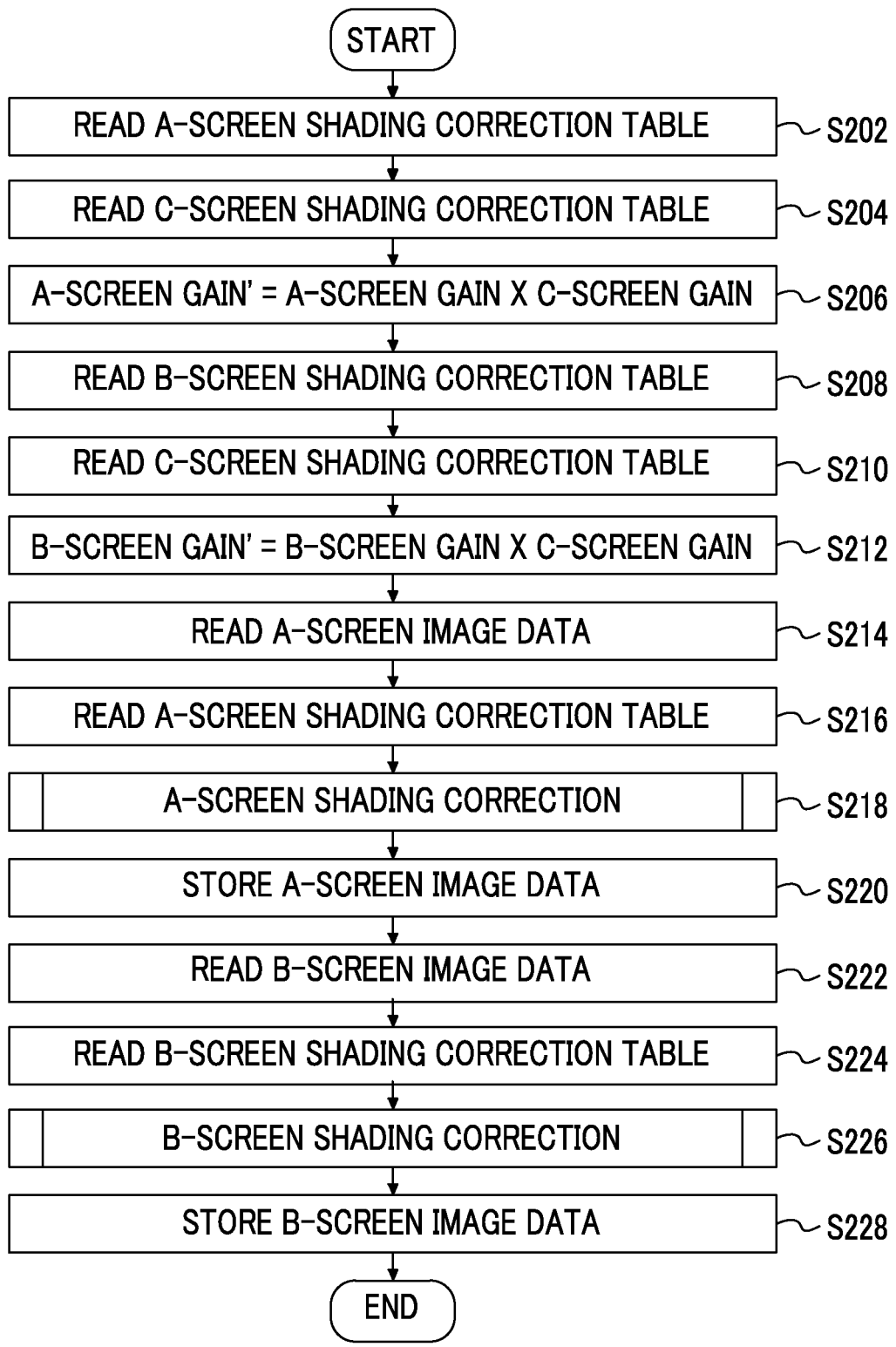
FIG. 12 is a flowchart illustrating the flow of a second example of a shading correction process.

FIG. 12 is a flowchart illustrating the flow of a second example of the shading correction process. This process is executed according to a program by the CPU 40. In the present example, it is assumed that the imaging element 16 is controlled by the device control section 32 and an object is three-dimensionally imaged by the imaging element 16.

First, the A-screen shading correction table is obtained from the memory 48 (step S202). An example of the A-screen shading correction table is shown on the upper side in FIG. 10.

Then, the C-screen shading correction table is obtained from the memory 48 (step S204).

Then, the correction gain (the first correction coefficient) of the A-screen shading correction table is multiplied by the correction gain (the third correction coefficient) of the C-screen shading correction table (step S206).

Further, the B-screen shading correction table is obtained from the memory 48 (step S208). An example of the B-screen shading correction table is shown on the lower side in FIG. 10.

Then, the C-screen shading correction table is obtained from the memory 48 (step S210).

Then, the correction gain (the second correction coefficient) of the B-screen shading correction table is multiplied by the correction gain (the third correction coefficient) of the C-screen shading correction table (step S212).

Then, the A-screen image (the first image) is obtained (step S214).

Then, the A-screen shading correction table is obtained from the memory 48 (step S216).

Then, the shading of the A-screen image is corrected, based on the A-screen shading correction table (step S218).

Further, the shading-corrected A-screen image is stored in the memory 48 (step S220).

Then, the B-screen image (the second image) is obtained (step S222).

Then, the B-screen shading correction table is obtained from the memory 48 (step S224).

Then, the shading of the B-screen image is corrected, based on the B-screen shading correction table (step S226).

Then, the shading-corrected B-screen image is stored in the memory 48 (step S228).

In the present example, the correction gain (the first correction coefficient) of the A-screen shading correction table is multiplied by the correction gain (the third correction coefficient) of the C-screen shading correction table to obtain a correction gain (a fourth correction coefficient) of a new A-screen shading correction table, and the correction gain (the second correction coefficient) of the B-screen shading correction table is multiplied by the correction gain (the third correction coefficient) of the C-screen shading correction table to obtain a correction gain (a fifth correction coefficient) of a new B-screen shading correction table. Further, the obtained A-screen image (the first image) is multiplied by the correction gain (the fourth correction coefficient) of the new A-screen shading correction table, and the obtained B-screen image (the second image) is multiplied by the correction gain (the fifth correction coefficient) of the new B-screen shading correction table.

As described above, the imaging device 10 includes: the single imaging optical system 15; the imaging element 16 that has the first pixel group and the second pixel group that photo-electrically converts the luminous fluxes that pass through the different areas of the imaging optical system 15, respectively, and that is capable of generating the A-screen image (the first image) that is formed by the output value of the first pixel group and the B-screen image (the second image) that is formed by the output value of the second pixel group; the pixel addition means 19 that is capable of generating the C-screen image (addition image) obtained by adding the pixel value of the first pixel group and the pixel value of the second pixel group; the memory 48 that stores the correction coefficients for the output values of the first pixel group and the second pixel group and stores the correction coefficient for matching the shading shape of the A-screen image that is formed by the output value of the first pixel group and the shading shape of the B-screen image that is formed by the output value of the second pixel group with the shading shape of the C-screen image (addition image) that is formed by the output value of the pixel addition means 19; the shading correction means (the CPU 40 and the image processing section 24) that calculates the correction coefficients stored in the memory 48 for the output values of the first pixel group and the second pixel group to match the shading shape of the A-screen image that is formed by the output value of the first pixel group and the shading shape of the B-screen image that is formed by the output value of the second pixel group with the shading shape of the C-screen image (addition image) that is formed by the output value of the pixel addition means 19. The pixel addition means in the present example is provided in the imaging element 16, and analogue-adds the pixel values of the first pixel group and the second pixel group. Further, the imaging device 10 in the present example includes: the device control section 32 that drives the imaging element 16 and performs a first drive for generating the A-screen image and the B-screen image without the pixel value addition and a second drive for generating the C-screen image (addition image) by the pixel value addition using the pixel addition means for the imaging element 16; and the CPU 40 that controls the three-dimensional imaging for obtaining the A-screen image and the B-screen image by driving the imaging element 16 by the device control section 32 using the first drive to image the object and the two-dimensional imaging for obtaining the C-screen image (addition image) by driving the imaging element 16 by the device control section 32 using the second drive to image the object, and that performs the two-dimensional imaging under the same imaging condition as in the three-dimensional imaging together when the object is imaged using the three-dimensional imaging. The CPU 40 functions as the correction coefficient calculation means that calculates the correction coefficients based on the A-screen image, the B-screen image and the C-screen image (addition image) and stores the resultant in the memory 48.

Figure 13:
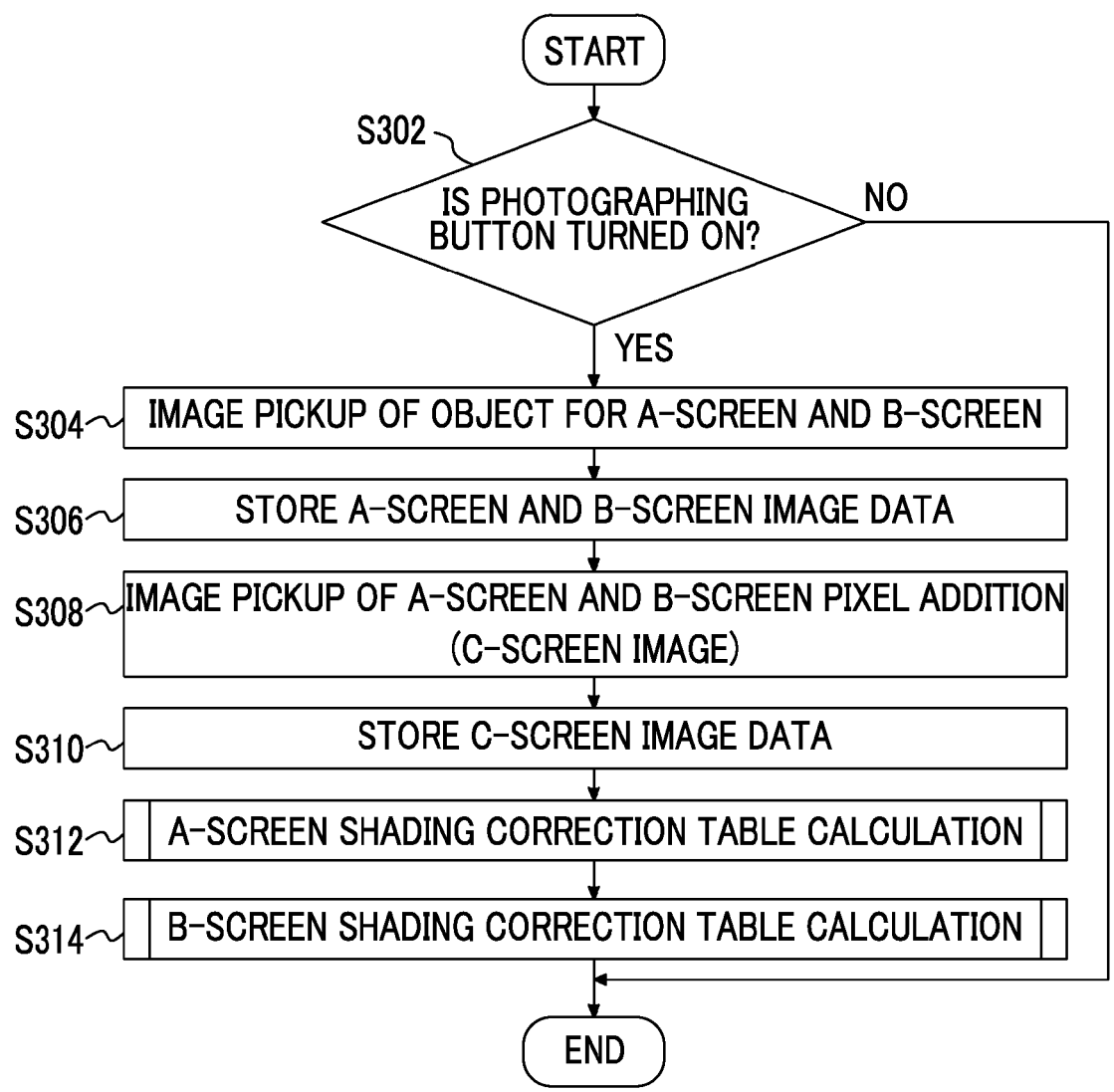
FIG. 13 is a flowchart illustrating the flow of an example of a shading correction coefficient calculation process.

FIG. 13 is a flowchart illustrating the flow of an example of the shading correction coefficient calculation process. This process is executed according to a program by the control of the CPU 40.

In the present example, it is assumed that the three-dimensional imaging mode among the three-dimensional imaging mode and the two-dimensional imaging mode is selected in advance by the operating section 38. For example, an imaging mode is switched by a three-dimensional/two-dimensional imaging mode switch button.

First, it is determined whether the imaging button (shutter button) of the operating section 38 is turned on (step S302).

If the imaging button is turned on, the AB-screen object imaging (three-dimensional imaging) is performed (step S304), and the A-screen image and the B-screen image are stored in the memory 48 (step S306). Then, the C-screen object imaging (two-dimensional imaging) for performing the pixel addition of the A-screen pixels and the B-screen pixels is performed under the same imaging condition as in the AB-screen object imaging (three-dimensional imaging) (step S308), and the C-screen image is stored in the memory 48 (in step 310). Here, the same imaging condition may include at least a diaphragm value using the stop 14 and a zoom position of the imaging lens 12. This is because if these imaging conditions are changed, the shading characteristic distribution is changed. The exposure time or the like may vary between the three-dimensional imaging and the two-dimensional imaging as the two-dimensional imaging is performed at exposure-under. Such a case will be described. The imaging element 16 is driven by the device control section 32 using the three-dimensional imaging to image the object, to thereby obtain the A-screen image and the B-screen image, and the imaging element 16 is driven by the device control section 32 using the two-dimensional imaging to image the object, to thereby obtain the C-screen image.

Then, the correction gain (correction coefficient) of the A-screen shading correction table is calculated based on the A-screen image and the C-screen image (step S312), the correction gain (correction coefficient) of the B-screen shading correction table is calculated based on the B-screen image and the C-screen image (step S314).

As described above, when the object is three-dimensionally imaged, it is necessary to calculate the correction coefficients in advance to be stored in the memory 48 by calculating the correction coefficients for the shading correction to be stored in the memory 48. In a case where the correction coefficients are prepared in advance, since the shading characteristic is changed depending on the zoom position and the diaphragm value, it is necessary to prepare a large amount of correction coefficients according to various imaging conditions. However, in the present example, since the correction coefficients are calculated (measured) in imaging, it is not necessary to prepare a large amount of correction coefficients. Further, even in a case where the imaging optical system 15 is exchangeable, it is not necessary to prepare correction coefficients corresponding to various imaging optical systems (exchangeable lenses).

FIG. 14A shows an example of the A-screen shading correction table. This example corresponds to a case where an image is divided into 8×8 in the horizontal direction and in the vertical direction, that is, divided into 64 areas in total. In the figure, x and y are integers that satisfy $0 \leq x < 8$ and $0 \leq y < 8$, respectively. When a gain (correction coefficient) for a pixel value of an A-screen image in an (x,y) area is represented as gain_$A(x,y)$, an output of the A-screen shown in FIG. 14B (output value of the A-screen pixel group indicated by the pixel value of the C-screen image) is represented as Signal_$A(x,y)$, and an output of the C-screen shown in FIG. 14C (output value of the pixel addition means indicated by the pixel value of the C-screen image) is represented as Signal_$C(x,y)$, gain_$A(x,y)$ is expressed as the following expression.

$$\text{gain\_}A(x,y) = \text{Signal\_}C(x,y)/\text{Signal\_}A(x,y)$$

If the calculated gain_A is multiplied by the pixel value of the A-screen image obtained using the three-dimensional imaging, the shading shape of the A-screen image and the shading shape of the C-screen image can be made equal.

That is, a correction coefficient calculating section divides the A-screen image and the C-screen image into plural areas, respectively, and calculates, for each divided area, the ratio of the output value of the A-screen pixel group in the A-screen image and the output value of the pixel addition in the C-screen image as a correction gain (gain_A) of the A-screen image. Similarly, the correction coefficient calculating section divides the B-screen image and the C-screen image into plural areas, respectively, and calculates, for each divided area, the ratio of the output value of the B-screen pixel group in the B-screen image and the output value of the pixel addition in the C-screen image as a correction gain (gain_B) of the B-screen image.

In the present example, the correction gain for each of 64 areas may be interpolated to obtain a correction gain for each pixel, and the obtained correction gain may be used as a gain for actual multiplication. The interpolation may include linear interpolation, spline interpolation or the like.

Figures 15A, 15B:
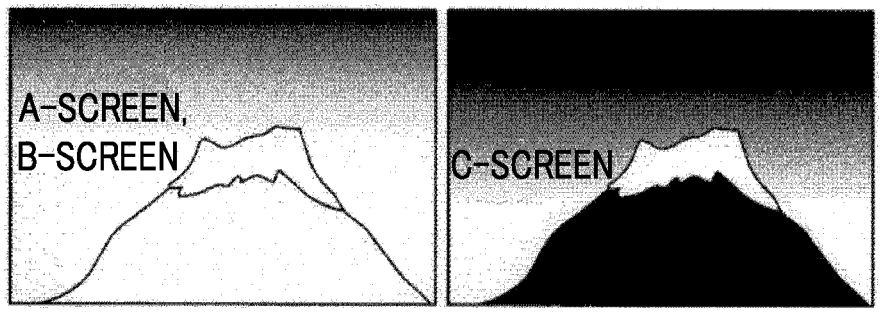
FIGS. 15A and 15B are diagrams illustrating when a C-screen image is at exposure-under.

As shown in FIG. 15A and FIG. 15B, when the three-dimensional imaging and the two-dimensional imaging are performed for the correction gain calculation, the CPU 40 performs the two-dimensional imaging (obtainment of the C-screen image) at exposure-under, compared with the three-dimensional imaging (obtainment of the A-screen and B-screen images).

Since a top portion in the A-screen image and the B-screen image shown in FIG. 15A may be saturated, there is a possibility that the correction gain cannot be correctly calculated in such a portion. Thus, as shown in FIG. 15B, the imaging is performed by reducing exposure to calculate an appropriate correction gain. That is, in the two-dimensional imaging where the pixel addition is performed, the imaging is performed based on an exposure value corresponding to the exposure-under so that the exposure-under is obtained, compared with the three-dimensional imaging.

Figure 16:
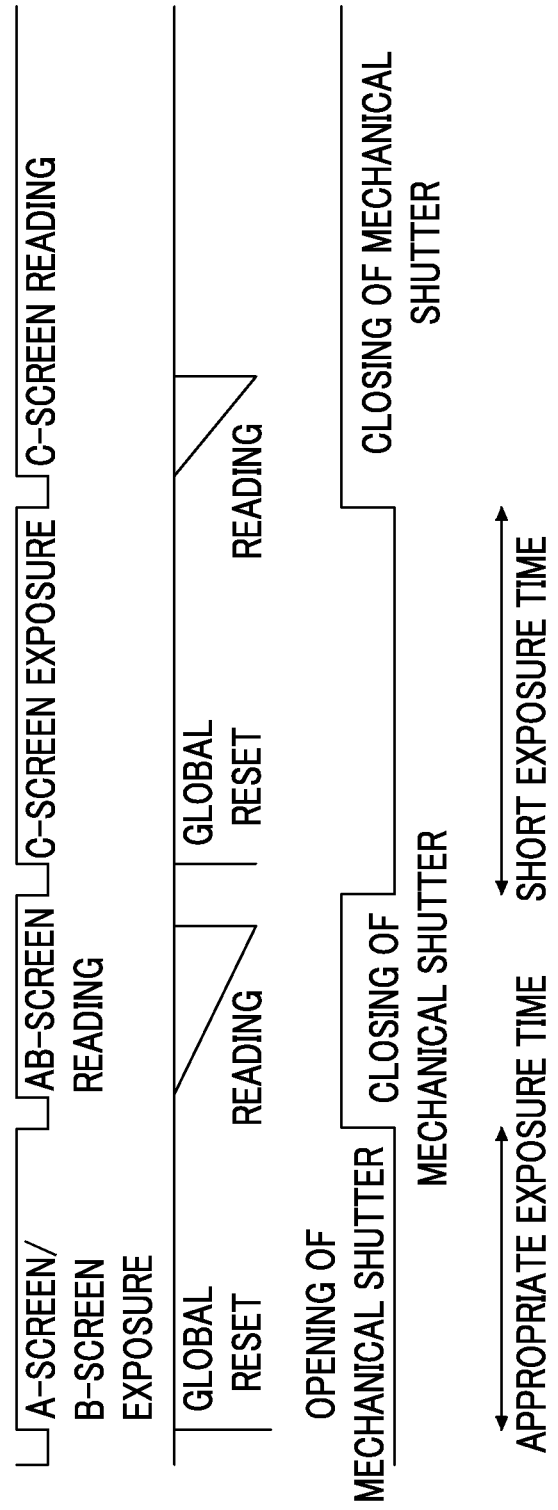
FIG. 16 is a timing chart illustrating an example of a case where an exposure time of a C-screen image is reduced.

FIG. 16 is a timing chart illustrating a case where the exposure time of the two-dimensional imaging is shorter than the exposure time of the three-dimensional imaging.

As shown in FIG. 16, first, the CPU 40 opens the mechanical shutter 17 to perform exposure of the pixel groups of the A-screen and the B-screen for an appropriate exposure time. Then, the CPU 40 closes the mechanical shutter 17 and reads stored charges (pixel values) of the pixel groups of the A-screen and the B-screen. Immediately after reading the pixel values of the pixel groups of the A-screen and the B-screen, the CPU 40 opens the mechanical shutter 17 to perform exposure of the C-screen for an exposure time shorter than the appropriate exposure time (exposure time of the pixel groups of the A-screen and the B-screen). Then, the CPU 40 closes the mechanical shutter 17 and reads stored charges of the C-screen pixel group. That is, the CPU 40 obtains the output values of the pixel addition means in the imaging element 16.

Figure 17:
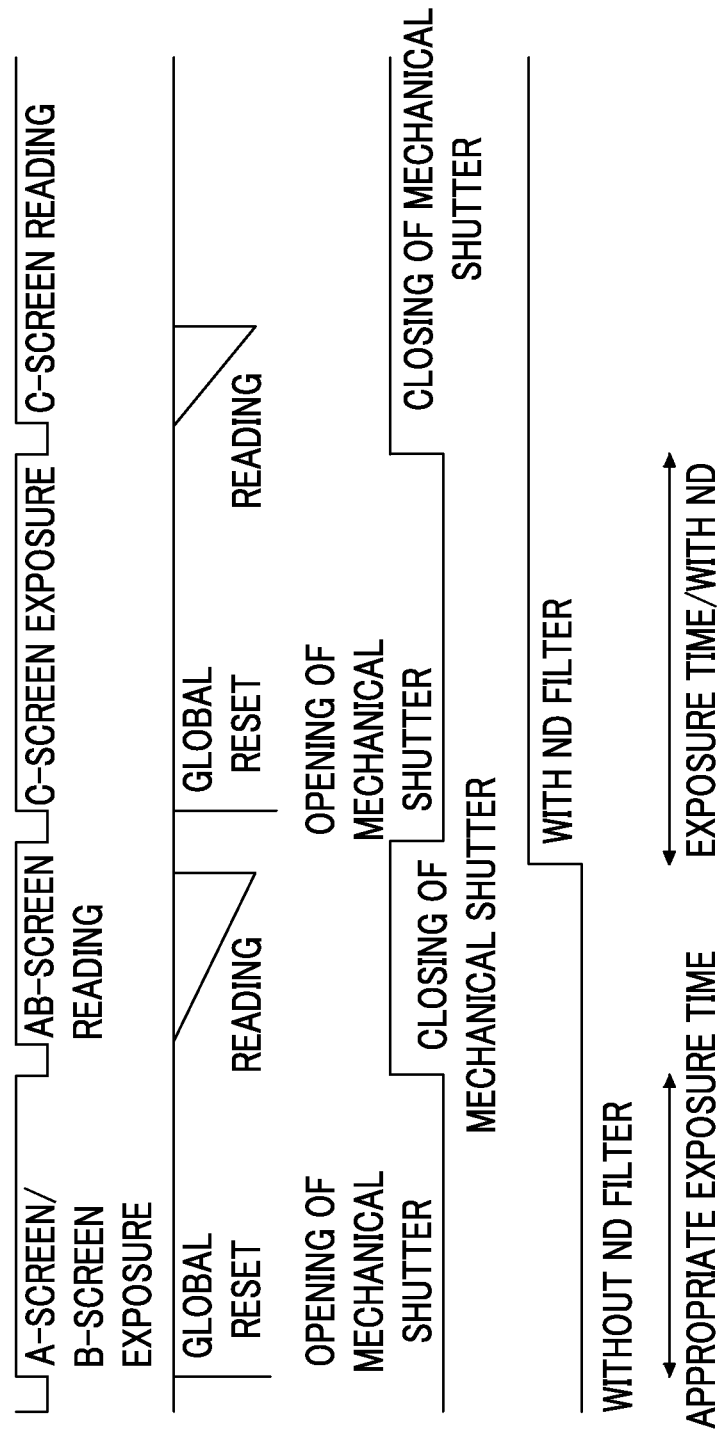
FIG. 17 is a timing chart illustrating an example of a case where an ND filter is used.

FIG. 17 is a timing chart illustrating a case where an object is imaged using an ND filter in the two-dimensional imaging. The ND filter is not shown in FIG. 1, but is provided between the imaging optical system 15 and the imaging element 16 (or inside the imaging optical system 15) to be inserted or detached under the control of the device control section 32.

Hereinafter, a different point from the case shown in FIG. 16 will be described. As shown in FIG. 17, the CPU 40 performs exposure of the pixel groups of the A-screen and the B-screen with the absence of the ND filter and finishes reading the pixel values of the pixel groups of the A-screen and the B-screen, and immediately then, inserts the ND filter between the imaging optical system 15 and the imaging element 16 (or inside the imaging optical system 15).

Further, the CPU 40 opens the mechanical shutter 17 and performs exposure of the C-screen with the presence of the ND filter.

Figure 18:
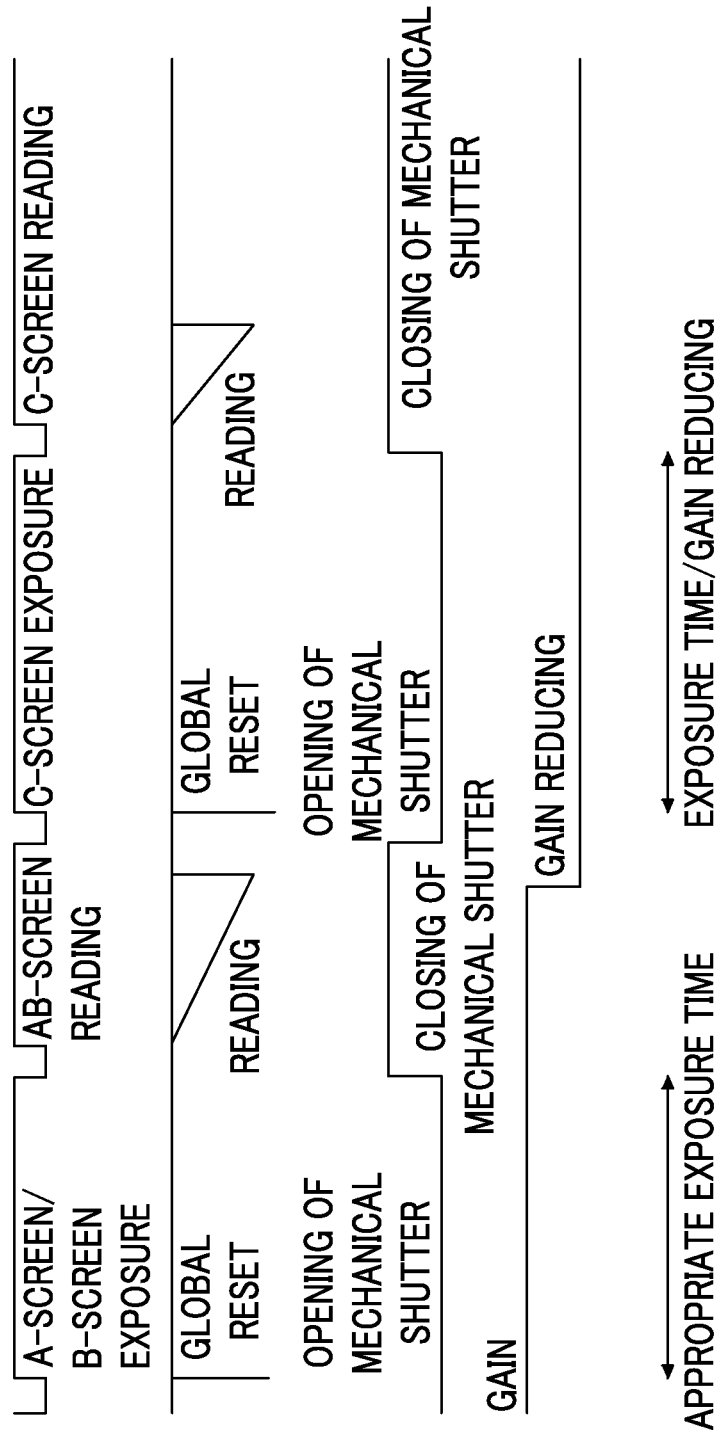
FIG. 18 is a timing chart illustrating an example of a case where an amplification gain of a C-screen image is lowered.

FIG. 18 is a timing chart illustrating a case where an amplification gain is reduced in the two-dimensional imaging, compared with the three-dimensional imaging.

Hereinafter, a different case from the case shown in FIG. 16 will be described. As shown in FIG. 18, in the two-dimensional imaging (exposure of the C-screen and reading of the C-screen), the CPU 40 reduces the amplification gain to image an object. The amplification may be performed at any place, and, it is performed inside the imaging element 16, for example. An amplifier may be provided between the imaging element 16 and the A/D converter 20, and the amplification may be performed by the amplifier.

Next, a first example of correction coefficient standardization will be described with reference to FIGS. 19 and 20.

In the first example, the CPU 40 (correction coefficient calculation means) subtracts an output value SC (C-screen output value) of the pixel addition means from an output value SA (A-screen output value) of the first pixel group to obtain SA-SC. SA-SC is a value with a positive or negative sign. In FIG. 19, the position of Xma with a triangle mark is a position where SA-SC becomes a highest value in all image areas. The CPU 40 performs standardization for setting a correction gain (correction coefficient) for the pixel value of the A-screen image in an image area where SA-SC becomes the highest value in the all image areas to "1", and for setting a correction gain for the A-screen image in other image areas to a value larger than "1". In FIG. 20, at the position of Xma, the correction gain is set to 1, and at the other positions, the correction gain is set to the value larger than 1.

Similarly, the CPU 40 subtracts the output value SC (C-screen output value) of the pixel addition means from an output value SB (B-screen output value) of the second pixel group (B-screen pixel group) to obtain SB-SC. SB-SC is a value with a positive or negative sign. The CPU 40 performs standardization for setting a correction gain (correction coefficient) for the pixel value of the B-screen image in an image area where SB-SC becomes the highest value in the all image areas to "1", and for setting a correction gain for the B-screen image in other image areas to a value larger than "1".

Figure 19:
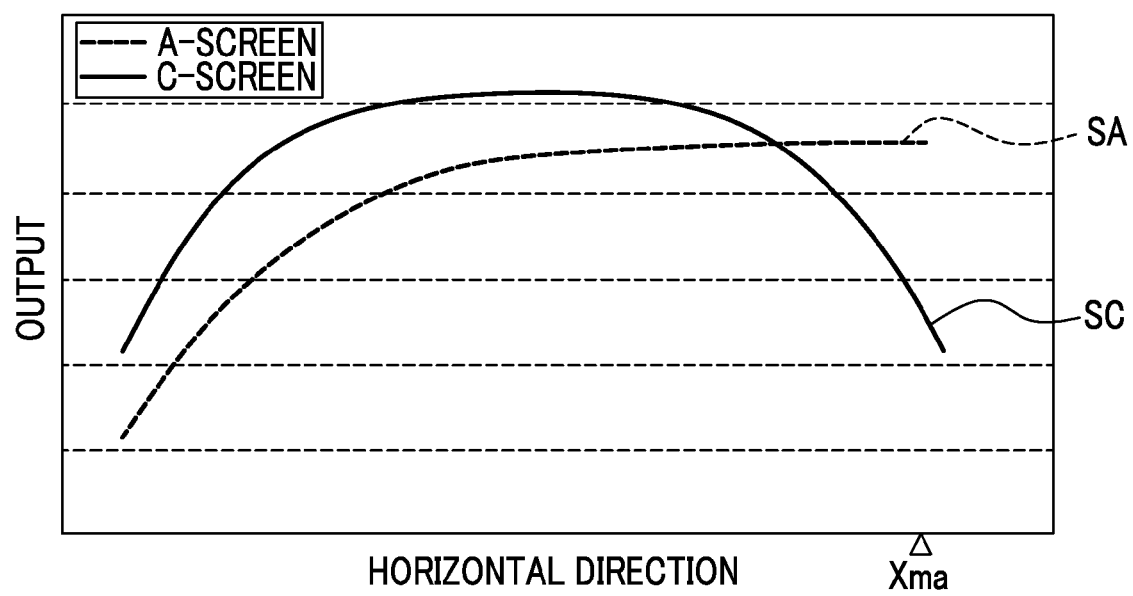
FIG. 19 is a graph illustrating examples of shading shapes of an A-screen image and a C-screen image in the horizontal direction.
Figure 20:
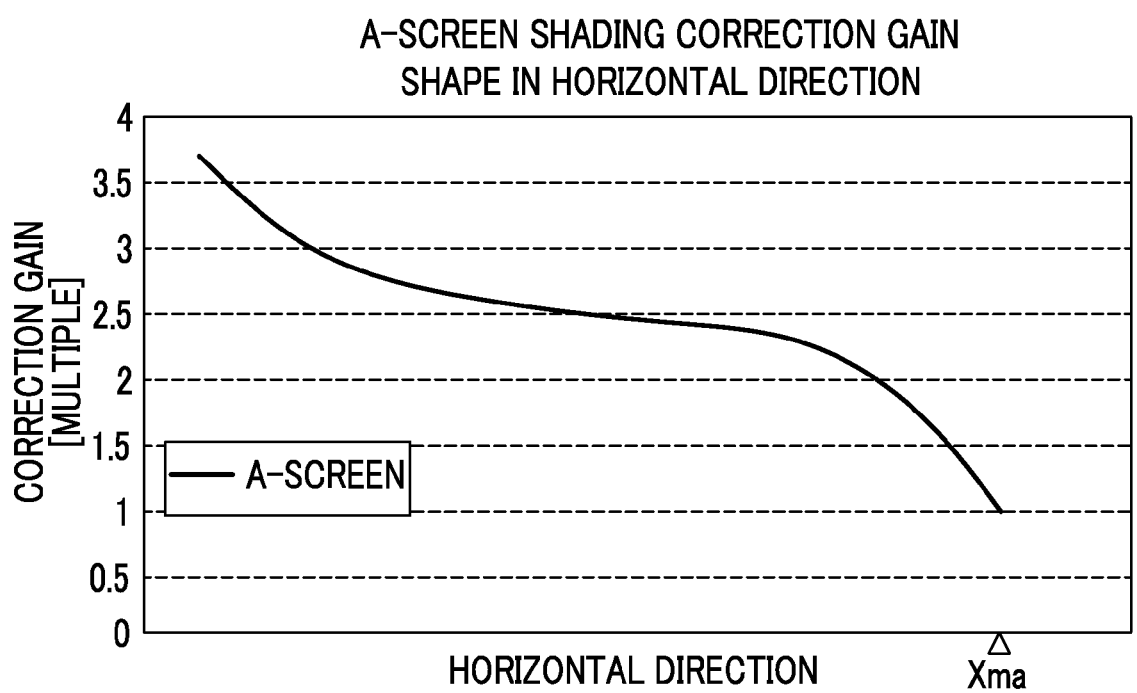
FIG. 20 is a graph illustrating an example of a correction gain shape of A-screen shading correction.

In the case of the shading shape shown in FIG. 19, if the lowest correction gain is set to "1" as shown in FIG. 20, then a negative correction gain is not multiplied, and thus, it is possible to prevent a phenomenon that white is not output by the shading correction when a signal output is saturated.

Next, a second example of correction coefficient standardization will be described with reference to FIGS. 21 and 22.

In the second example, the CPU 40 (correction coefficient calculation means) subtracts an output value SC (C-screen output value) of the pixel addition means from an output value SA (A-screen output value) of the first pixel group to obtain SA-SC, and subtracts the output value SC (C-screen output value) of the pixel addition means from an output value SB (B-screen output value) of the second pixel group to obtain SB-SC. SA-SC and SB-SC are values with a positive or negative sign. In FIG. 19, the position of Xmab with a triangle mark is a position where SA-SC or SB-SC becomes a highest value among SA-SC and SB-SC in all image areas. The CPU 40 performs standardization for setting a correction coefficient in an image area corresponding to the highest value (SA-SC or SB-SC) among the first subtraction result SA-SC and the second subtraction result SB-SC in all the image areas, which sets a correction coefficient for an image (in the present example, the B-screen image) corresponding to the highest value, to "1", and sets a correction coefficient in a other image areas to a value larger than "1". In FIG. 22, at the position of Xmab, the correction gain for the B-screen output value is set to 1, and at the other positions thereof, the correction gain is set to the value larger than 1.

Figure 21:
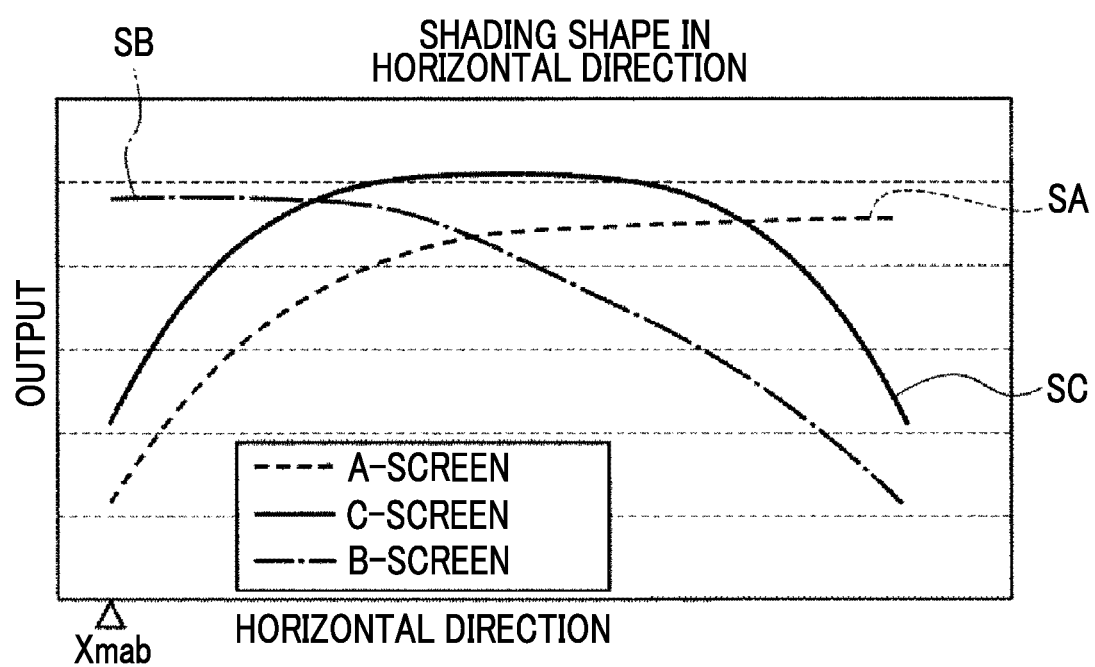
FIG. 21 is a graph illustrating examples of shading shapes of an A-screen image, a B-screen image and a C-screen image in the horizontal direction.
Figure 22:
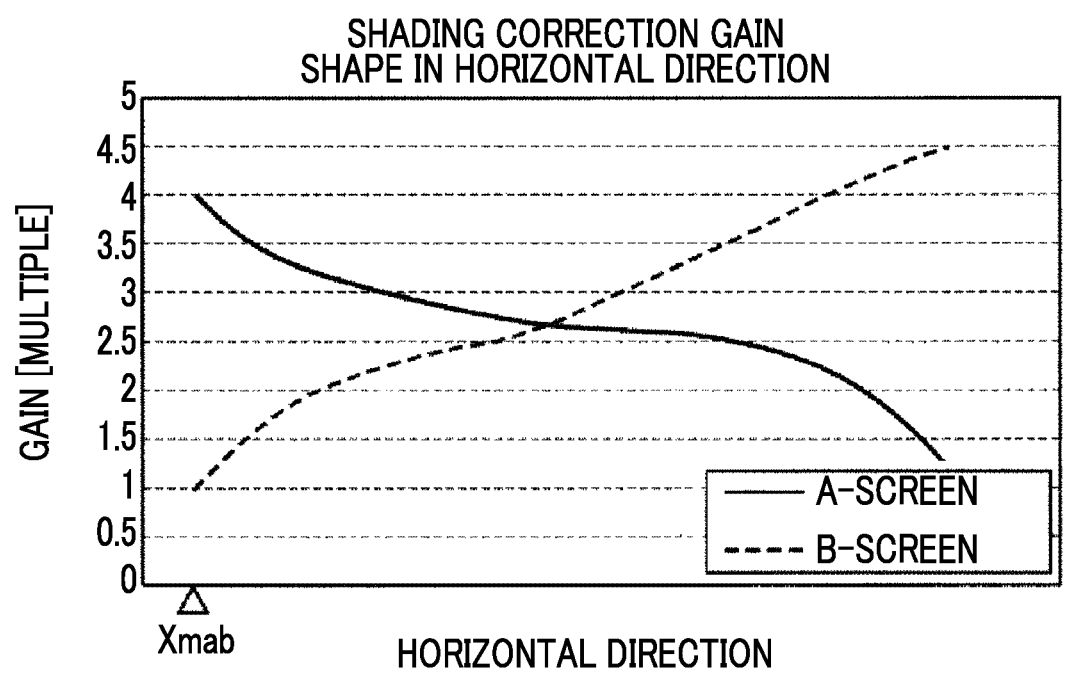
FIG. 22 is a graph illustrating examples of correction gain shapes of A-screen shading correction and B-screen shading correction.

In the case of the shading shape shown in FIG. 21, since if the lowest correction gain is set to "1" as shown in FIG. 22, a negative correction gain is not multiplied, it is possible to prevent a phenomenon that white is not output by the shading correction when a signal output is saturated. Further, in the present example, the brightness of the A-screen and the B-screen are aligned.

The first pixel group and the second pixel group of the imaging element 16 includes plural pixels that are respectively provided with color filters of R (red), G (green) and B (blue) color, and the pixel addition means adds pixel values of pixels of the same color for each color of R, G and B.

Figure 23:
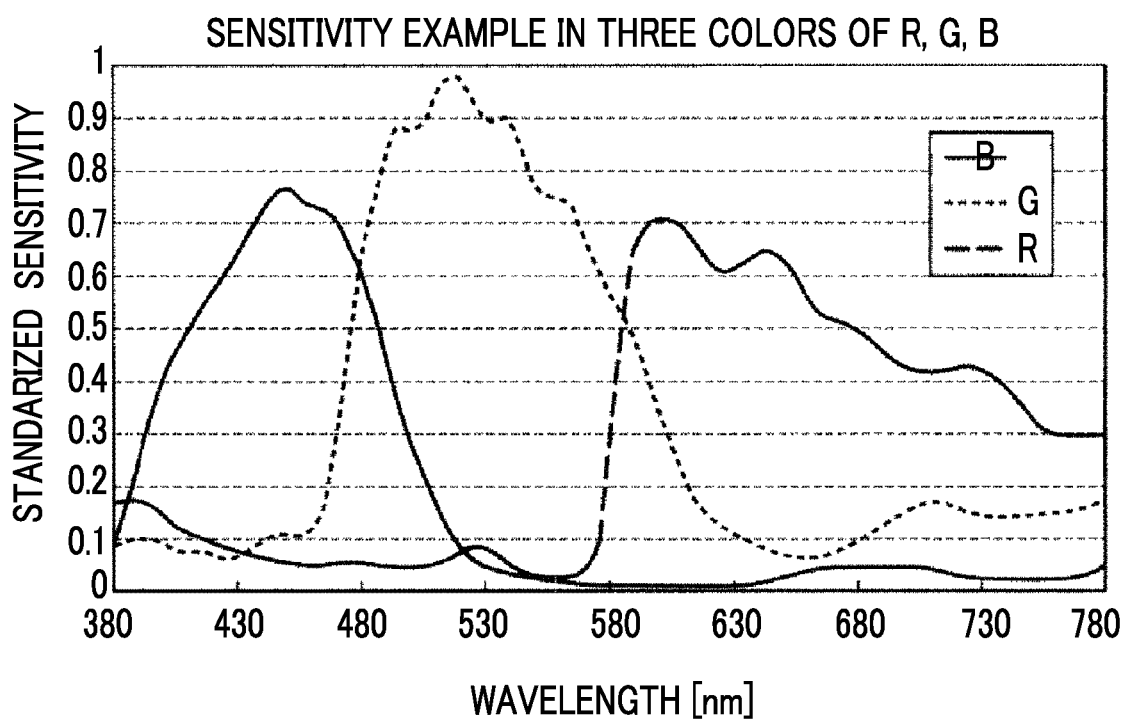
FIG. 23 is a graph illustrating an example of sensitivity in each color of R, G and B.

FIG. 23 shows an example of spectral characteristics of R, G and B. As shown in FIG. 23, by using primary color filters of R, G and B, it is possible to achieve a full-color three-dimensional image.

As shown in FIG. 24, the memory 48 stores a correction coefficient for each color of R, G and B. Shading correction tables shown in FIG. 24 correspond to correction coefficient tables for R of the A-screen, G of the A-screen, B of the A-screen, R of the B-screen, G of the B-screen, and B of the B-screen, respectively.

Hereinbefore, the imaging element 16 having two viewpoints having two pixel groups has been described as an example, but an imaging element that obtains phase difference images having four or more viewpoints may be used. Each shading correction process described above may be applied to the phase difference images having four or more viewpoints.

Figure 25:
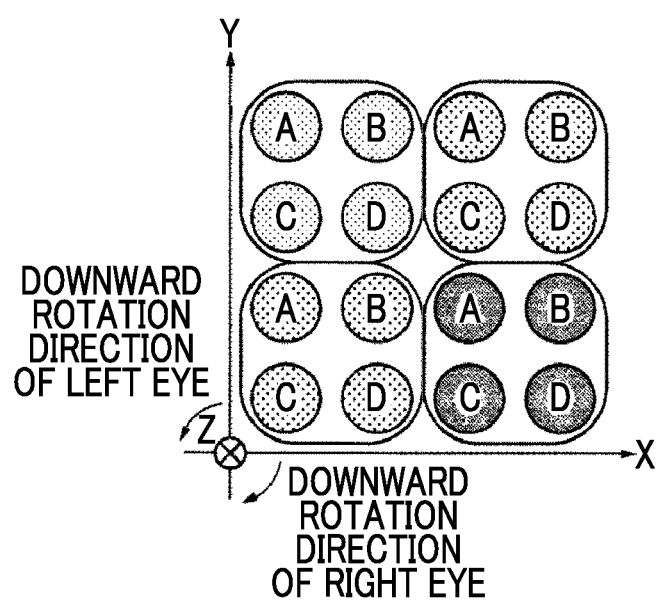
FIG. 25 is a diagram partially illustrating an example of an imaging element having four pixel groups.

FIG. 25 is a diagram illustrating a configuration example of an imaging element 16 having four or more viewpoints.

As shown in FIG. 25, on a light reception surface of the imaging element 16, color filters of red, blue and green, four-viewpoint pixel groups of pixels A, B, C and D corresponding to the respective color filters, and microlenses ML corresponding to the four pixel groups are arranged. The light reception means that includes the color filters, four pixel groups and the microlenses may be arranged in the Bayer form.

The Bayer array has a configuration in which when color filters of three primary color coordinates of red (R, r), green (G, g) and blue (B, b) are arranged on the four pixel groups formed in a square lattice form in a surface portion of a semiconductor substrate of the imaging element 16, a row in which respective filters of red and green are alternately arranged and a row in which respective filters of green and blue are alternately arranged are alternately arranged in a column direction.

In FIG. 25, the XY plane represents the light reception surface of the imaging element 16, X represents a row direction, and Y represents a column direction. When seen from a photographer, Pixels A and C are located on the left side, and pixels B and D are located on the right side. Z represents an optical axis direction of a lens 12, in which a direction toward an object (a direction from the paper surface to the rear in the figure) is a positive direction. Hereinafter, image data read from the pixels A, B, C and D are referred to as A-screen image data, B-screen image data, C-screen image data and D-screen image data, respectively.

The Bayer array has a configuration in which when color filters of three primary color coordinates of red (R, r), green (G, g) and blue (B, b) are arranged on the four pixel groups formed in a square lattice form in a surface portion of a semiconductor substrate of the imaging element 16, a row in which respective filters of red and green are alternately arranged and a row in which respective filters of green and blue are alternately arranged are alternately arranged in a column direction.

Figure 26:
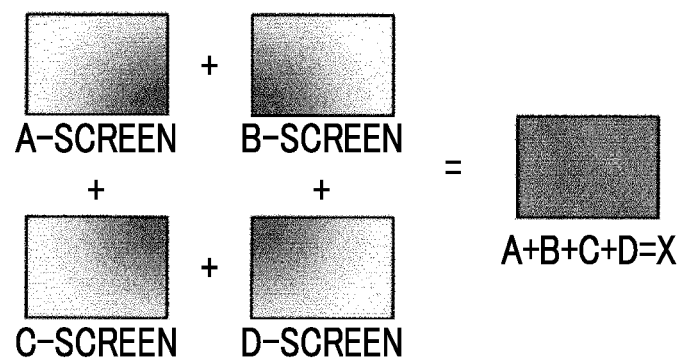
FIG. 26 is a diagram illustrating four-pixel addition.

In the case of the four viewpoints, a correction process is performed as follows. That is, as shown in FIG. 26, the A-screen image data, the B-screen image data, the C-screen image data and the D-screen image data are obtained, and all the pieces of image data are combined to obtain an addition image X.

In the case of four pixel groups (A to D screen pixel groups), the pixel addition means adds pixel values for each combination of four corresponding pixels in four image groups, to thereby generate one addition image X. The memory 48 stores a correction coefficient for matching a shading shape of each viewpoint image (each of the A to D screen images) that is formed by an output value of each pixel group of the A to D screen pixel groups with a shading shape of the addition image X that is formed by an output value of the pixel addition means. The CPU 40 as shading correction means calculates a correction coefficient stored in the memory 48 for the output value of each pixel group (each of the A to D screen pixel groups), to thereby match the shading shape of each viewpoint image (A to D screen images) that is formed by the output value of each pixel group (each of the A to D screen image groups) with the shading shape of the addition image X that is formed by the output value of the pixel addition means.

Hereinbefore, a case where the addition of the pixel values (pixel addition) is performed in the imaging element 16 has been described as an example, but the invention is not limited thereto. The pixel addition of the A-screen image and the B-screen image converted from analogue to digital by the A/D converter 20 (also referred to as "image addition") may be performed.

The shading correction when the pixel addition is performed outside the imaging element 16 will be described. In FIG. 1, the CPU 40 drives the imaging element 16 by the device control section 32 to image an object. That is, the imaging element 16 performs three-dimensional imaging for obtaining the A-screen image and the B-screen image. The A-screen image and the B-screen image output from the imaging element 16 are input to the image processing section 24. The image processing section 24 adds a digital pixel value of the A-screen image and a digital pixel value of the B-screen image to generate the C-screen image (addition image). The CPU 40 calculates correction coefficients based on the A-screen image and the B-screen image output from the imaging element 16 and the C-screen image, and stores the correction coefficients in the memory 48. Since the calculation of the correction coefficients based on the A-screen image, the B-screen image and the C-screen image are the same as the pixel addition in the imaging element 16, the description thereof will not be repeated.

The correction coefficient calculation when the pixel addition is performed outside the imaging element 16 will be described. In FIG. 1, the CPU 40 calculates correction coefficients based on the A-screen image and the B-screen image output from the imaging element 16, and the C-screen image (addition image) output from the image processing section 24 to which the A-screen image and the B-screen image are input, and stores the correction coefficients in the memory 48. Since details about the calculation of the correction coefficients based on the A-screen image, the B-screen image and the C-screen image are the same as the case where the pixel addition is performed outside the imaging element 16, the description thereof will not be repeated.

Further, a case where the imaging element 16 includes two pixel groups and the pixel addition of two pixel groups is performed has been described, but the invention is not limited thereto. For example, as shown in FIG. 25, pixel values of four pixel groups may be added using the imaging element 16 having four pixel groups.

This specification discloses an imaging device that includes a single imaging optical system; an imaging element that includes plural pixel groups that photo-electrically convert luminous fluxes that pass through different areas of the imaging optical system and is capable of generating plural viewpoint images that are formed by respective output values of the plural pixel groups; a pixel addition means that is capable of adding pixel values for each combination of the corresponding plural pixels in the plural image groups to generate one addition image; correction coefficient storage means that stores a correction coefficient for the output value of each pixel group, which stores a correction coefficient for matching a shading shape of each viewpoint image that is formed by the output value of each pixel group with a shading shape of the addition image that is formed by the output value of the pixel addition means, and shading correction means that calculates a correction coefficient stored in the correction coefficient storage means for the output value of each pixel group to match the shading shape of each viewpoint image that is formed by the output value of each pixel group with the shading shape of the addition image that is formed by the output value of the pixel addition means.

The shading adjustment can be done at the time of factory shipment, at the time of imaging of a white wall or by double exposure at the time of every imaging.

The invention is not limited to the examples described in this specification and the examples shown in the drawings, and may include various design modifications and improvements within a range that does not depart from the spirit of the invention.

REFERENCE SIGNS LIST

10 Imaging device
12 imaging lens
14 Stop
15 imaging optical system
16 Imaging element
20 A/D converter (AD converter in drawings)
24 Image processing section
28 Encoder
32 Device control section
38 Operating section
48 Memory

What is claimed is:

1. An imaging device comprising:
a single imaging optical system;
an imaging element that includes a first pixel group and a second pixel group that respectively photo electronically convert luminous fluxes that pass through different areas of the single imaging optical system,
imaging element being configured
to generate a first three-dimensional image that is formed of a first A-screen image according to output value of the first pixel group and a second B-screen image according to output values of the second pixel group;
to generate a two dimensional C-screen image using a pixel addition means to perform pixel addition for the pixels of the first A-screen image and the second B-screen image under the same imaging condition as in the first three-dimensional image;
a shading correction unit configured to
calculate correction gains for an A-screen shading correction table based on the first A-screen image and the two dimensional C-screen image during imaging such that a pixel value of the first A-screen image multiplied by its related correction gain equals the corresponding pixel value of the two dimensional pixel value of the two dimensional C-screen image and
calculate correction gains for a B-screen shading correction table based on the second B-screen image and the two dimensional C-screen image during imaging such that a pixel value of the first B-screen image multiplied by its related correction gain equals the corresponding pixel value of the two dimensional C-screen image.

2. The imaging device according to claim 1,
wherein the imaging device further comprises correction coefficient storage unit configured to store the correction coefficients, and
wherein the shading correction unit is configured to correct the output values of the first and second pixel groups by the correction coefficients stored in the correction storage unit.

3. The imaging device according to claim 2, wherein:
the pixel addition unit is provided in the imaging element and is configured to, analogue add a pixel value of the first pixel group and a pixel value of the second pixel group and to output the addition signal; and
drive unit are configured to drive the imaging element and to perform a first drive for generating the first A-screen image and the second B-screen image without analogue addition and a second drive to generate the second two-dimensional C-screen image analogue addition,
control unit configured to control three-dimensional imaging for obtaining the first A-screen image and the second B-screen image by driving the imaging element by the drive unit using the first drive to image an object and for controlling two-dimensional imaging for obtaining the two dimensional C-screen image by driving the imaging element by the drive unit using the second drive to image the object, and configured to perform two-dimensional imaging in parallel with the three-dimensional imaging when the object is imaged by the three-dimensional imaging; wherein
calculated correction coefficients are stored in the correction coefficient storage unit.

4. The imaging device according to claim 2, wherein:
the pixel addition unit is configured to digitally add pixel values of the first pixel group and pixel values of the second pixel group as from the imaging element;
drive unit configured to drive the imaging element,
control unit configured to perform three-dimensional imaging for obtaining the first A-screen image and second B-screen image by driving the imaging element by the drive unit to image an object; and
correction coefficient calculation unit configured to calculate the correction coefficients based on the first A-screen image and second B-screen image and the two-dimensional C-screen image and configured to store the calculated correction coefficients in the correction coefficient storage unit.

5. The imaging device according to claim 3, wherein:
the control unit is configured to reduce exposure of the two-dimensional imaging compared with the three-dimensional imaging when the three-dimensional imaging and the two-dimensional imaging are formed to obtain a shading shale of the two-dimensional C-screen image.

6. The imaging device according to claim 5, wherein:
the control unit is configured to shorten an exposure time of the two-dimensional imaging compared with an exposure time of the three-dimensional imaging.

7. The imaging device according to claim 5,
wherein the control unit is configured to image the object using an ND filter in the two-dimensional imaging.

8. The imaging device according to claim 5,
wherein the control unit is configured to reduce a gain in the two-dimensional imaging compared with the three-dimensional imaging.

9. The imaging device according to claim 3, wherein the shading correction unit is configured to set the correction coefficients in such a manner that the first A-screen image, the second B-Screen image, and the two-dimensional C-screen image are respectively divided into a plurality of areas the ratios of the output values of the respective pixel groups in the first A-screen image and the second B-screen image and the output value of the pixel addition unit in the two-dimensional C-screen image are calculated for each divided area, in the ratios for each divided area are used as the correction coefficients.

10. The imaging device according to claim 3, wherein the shading correction unit is configured to set the correction coefficients in such a manner that the output value of the pixel addition unit is subtracted from the output value of the first pixel group to obtain a first subtraction result, to use the correction coefficient for the output value of the first pixel group in an image area where the first subtraction result is the highest value as the reference, the correction coefficient for the output value of the first pixel group in the other image areas is larger than the reference, and the output value of the pixel addition unit is subtracted from the output value of the second pixel group to obtain a second subtraction result, and to use the correction coefficient for the output value of the second image group in an image area where the second subtraction result is the highest value as a reference, the correction coefficient for the output value the second image group in the other image areas is larger than the reference.

11. The imaging device according to claim 3,
wherein the shading correction unit is configured to set the correction coefficients in such a manner that the output value of the pixel addition unit subtracted from the output value of the first pixel group to obtain a first subtraction result, the output value of the pixel additional unit is subtracted from the output value of the second pixel group to obtain a second subtraction result, and to use the correction coefficient corresponding to the first subtraction result or the second subtraction result that is the highest value among the first subtraction result and the second subtraction result in all image areas as a reference, and to perform standardization for making the other correction coefficient larger than the reference.

12. The imaging device according to claim 2,
wherein the correction coefficient storage unit is configured to store a first correction coefficient for matching a shading shape of the first A-screen image with the shading shape of the two-dimensional C-screen image, a second correction coefficient for matching a shading shape of the second B-screen image with the shading shape of the two-dimensional C-screen image, and a third correction coefficient for correcting the shading shape of the two-dimensional C-screen image, and wherein
the shading correction unit is configured to calculate the third correction coefficient after calculating the first correction coefficient for a pixel value of the first A-screen image, and to calculate the third correction coefficient after calculating the second correction coefficient after calculating the second correction coefficient for a pixel value of the second B-screen image.

13. The imaging device according to claim 2,
wherein the correction coefficient storage unit is configured to store a first correction coefficient for matching a shading shape of the first A-screen image with a shading shape of the two-dimensional C-screen image, a second correction coefficient for matching a shading shape of the second B-screen image with the shading shape of the two-dimensional C-screen image, and a third correction coefficient for correcting the shading shape of the two-dimensional C-screen image, and wherein
the correction coefficient storage unit is configured to obtain a fourth correction coefficient by multiplying the first correction coefficient by the third correction coefficient, to obtain a fifth correction coefficient by multiplying the second correction coefficient by the third correction coefficient, and to calculate the fourth correction coefficient for the first A-screen image, add to calculate the fifth correction coefficient for the second B-screen image.

14. The imaging device according to claim 1,
wherein the first pixel group and the second pixel group of the imaging element respectively include a plurality of pixels provided with each color filter of R (red), G (green), and B (blue), and
the pixel additional unit is configured to add pixel values of the pixels with the same color for each color of R, G, and B.

15. The imaging device according to claim 14,
wherein the correction coefficient storage unit is configured to store the correction coefficient for each color of R, G, and B.

16. The imaging device according to claim 1,
wherein the second signal second pixel group includes two or more pixel groups.

17. An imaging method operated in an imaging device comprising a single optical imaging system and an imaging element that includes a first pixel group and a second pixel that respectively photo-electronically convert luminous fluxes that pass through different areas of the single imaging optical system, comprising the steps:
generating a first three-dimensional image that is formed of a first A-screen image according to output values of the first pixel group and a second B-screen image according to output values of the second pixel group;
generating a two-dimensional C-screen image using a pixel addition unit to perform pixel addition for the pixels of the first A-screen image and the second B-screen image under the same imaging condition as in the first three-dimensional image;
calculating correction gains for an A-screen shading correction table based on the first A-screen image and the two-dimensional C-screen image during imaging such that a pixel value of the first A-screen image multiplied by its related correction gain equals the corresponding pixel value of the two-dimensional C-screen image; and calculating correction gains for a B-screen shading correction table based on the second B-screen image and the two-dimensional C-screen image during imaging such that a pixel value of the first B-screen image multiplied by its related correction gain equals the corresponding pixel value of the two-dimensional C-screen image.

* * * * *